United States Patent
Hamilton, Jr. et al.

(10) Patent No.: US 8,164,651 B2
(45) Date of Patent: Apr. 24, 2012

(54) CONCENTRIC EXPOSURE SEQUENCE FOR IMAGE SENSOR

(75) Inventors: John F. Hamilton, Jr., Rochester, NY (US); John T. Compton, LeRoy, NY (US); Bruce H. Pillman, Rochester, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 657 days.

(21) Appl. No.: 12/111,219

(22) Filed: Apr. 29, 2008

(65) Prior Publication Data

US 2009/0268055 A1 Oct. 29, 2009

(51) Int. Cl.
*H04N 5/235* (2006.01)
*H04N 3/14* (2006.01)

(52) U.S. Cl. ................. 348/229.1; 348/276
(58) Field of Classification Search ............. 348/229.1, 348/230.1, 276–280
See application file for complete search history.

(56) References Cited

U.S. PATENT DOCUMENTS

| | | | |
|---|---|---|---|
| 3,971,065 A | 7/1976 | Bayer | |
| 4,246,601 A | 1/1981 | Sato et al. | |
| 4,390,895 A | 6/1983 | Sato et al. | |
| 4,984,279 A | 1/1991 | Kidney et al. | |
| 5,194,351 A | 3/1993 | Roller | |
| 5,323,233 A | 6/1994 | Yamagami et al. | |
| 5,641,596 A | 6/1997 | Gray et al. | |
| 5,949,914 A | 9/1999 | Yuen | |
| 6,441,848 B1 | 8/2002 | Tull | |
| 6,476,865 B1 | 11/2002 | Gindele et al. | |
| 6,714,239 B2 | 3/2004 | Guidash | |
| 6,759,646 B1 * | 7/2004 | Acharya et al. | 250/226 |
| 6,937,774 B1 | 8/2005 | Specht et al. | |
| 7,239,342 B2 | 7/2007 | Kingetsu et al. | |
| 7,340,099 B2 | 3/2008 | Zhang | |
| 7,671,316 B2 * | 3/2010 | Kanai et al. | 250/208.1 |
| 7,839,437 B2 | 11/2010 | Kasai et al. | |
| 2002/0158977 A1 | 10/2002 | Hamilton | |
| 2004/0212723 A1* | 10/2004 | Lin | 348/362 |
| 2006/0017829 A1* | 1/2006 | Gallagher | 348/276 |
| 2006/0017837 A1 | 1/2006 | Soreko et al. | |

(Continued)

FOREIGN PATENT DOCUMENTS

| | | |
|---|---|---|
| EP | 0 913 869 A2 | 5/1999 |
| GB | 2345217 | 6/2000 |
| JP | 2007288549 | 11/2007 |

OTHER PUBLICATIONS

International Preliminary Report on Patentability mailed Nov. 2, 2010, for International Patent Application No. PCT/US2009/002329, 7 pages.

(Continued)

*Primary Examiner* — David Ometz
*Assistant Examiner* — Dillon Durnford Geszvain
(74) *Attorney, Agent, or Firm* — Blakely Sokoloff Taylor & Zafman LLP

(57) ABSTRACT

A method for image capture includes providing an image sensor having at least one segmented row of pixels, wherein the at least one segmented row comprises at least first and second disjoint row subsets of pixels, wherein the reset and readout operations for each row subset are controllably independent of each other; timing the exposure interval of the first subset to be photographically centered with the exposure interval of the second subset; and combining the image data obtained from the first and second row subset exposures to form a row of pixel values.

9 Claims, 21 Drawing Sheets

U.S. PATENT DOCUMENTS

| | | |
|---|---|---|
| 2006/0139470 A1 | 6/2006 | McGowan |
| 2006/0187308 A1 | 8/2006 | Lim et al. |
| 2007/0024931 A1 | 2/2007 | Compton et al. |
| 2007/0046807 A1 | 3/2007 | Hamilton et al. |
| 2007/0223831 A1 | 9/2007 | Mei et al. |
| 2007/0285526 A1 | 12/2007 | Mann et al. |
| 2008/0012969 A1 | 1/2008 | Kasai et al. |
| 2008/0043128 A1 | 2/2008 | Poonnen et al. |
| 2008/0129752 A1 | 6/2008 | Riley et al. |
| 2008/0218597 A1 | 9/2008 | Cho |
| 2009/0091645 A1 * | 4/2009 | Trimeche et al. ............. 348/273 |
| 2010/0104209 A1 | 4/2010 | Deever et al. |

OTHER PUBLICATIONS

International Search Report mailed Jul. 15, 2009, for International Patent Application No. PCT/US2009/002329, 4 pages.

International Preliminary Report on Patentability mailed Apr. 26, 2011, for International Patent Application No. PCT/US2009/005531, 8 pages.

International Search Report mailed Mar. 30, 2010, for International Patent Application No. PCT/US2009/00005531, 6 pages.

* cited by examiner

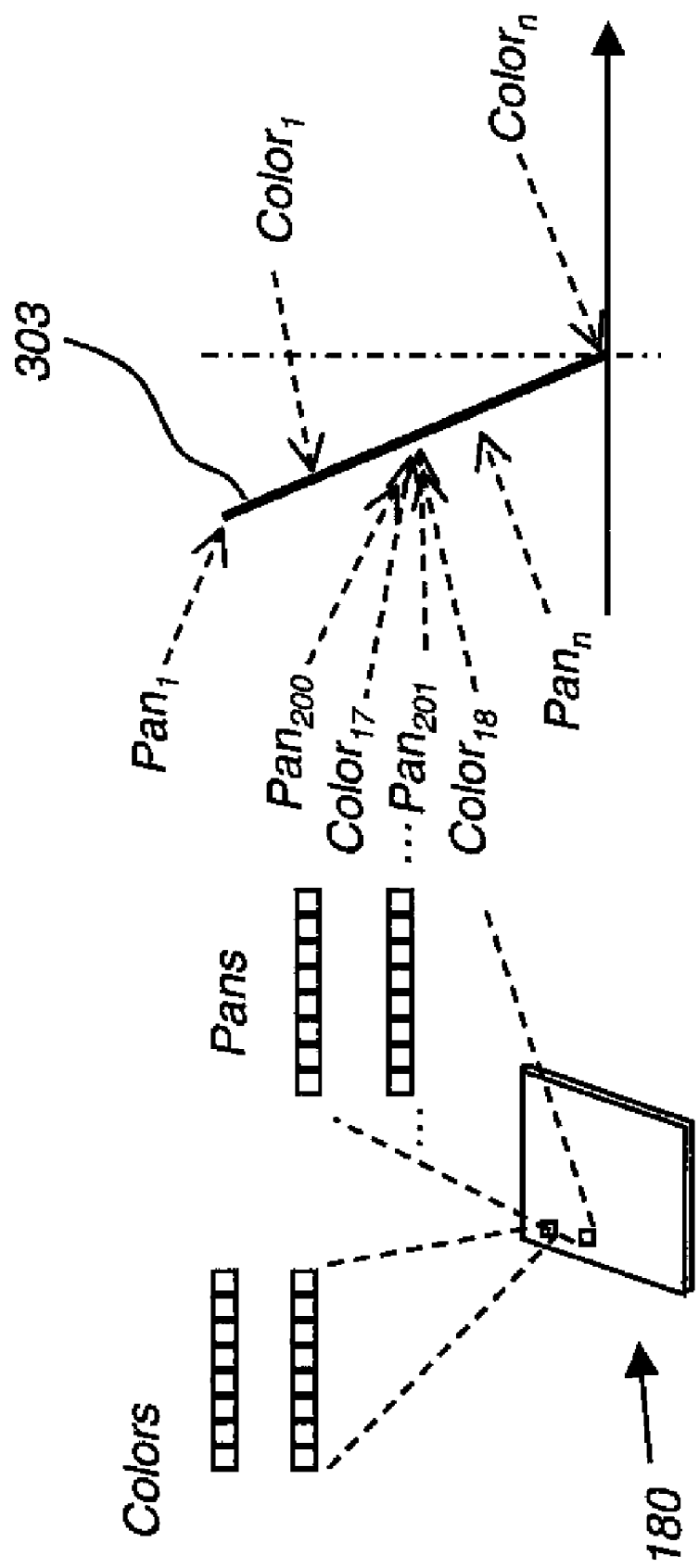

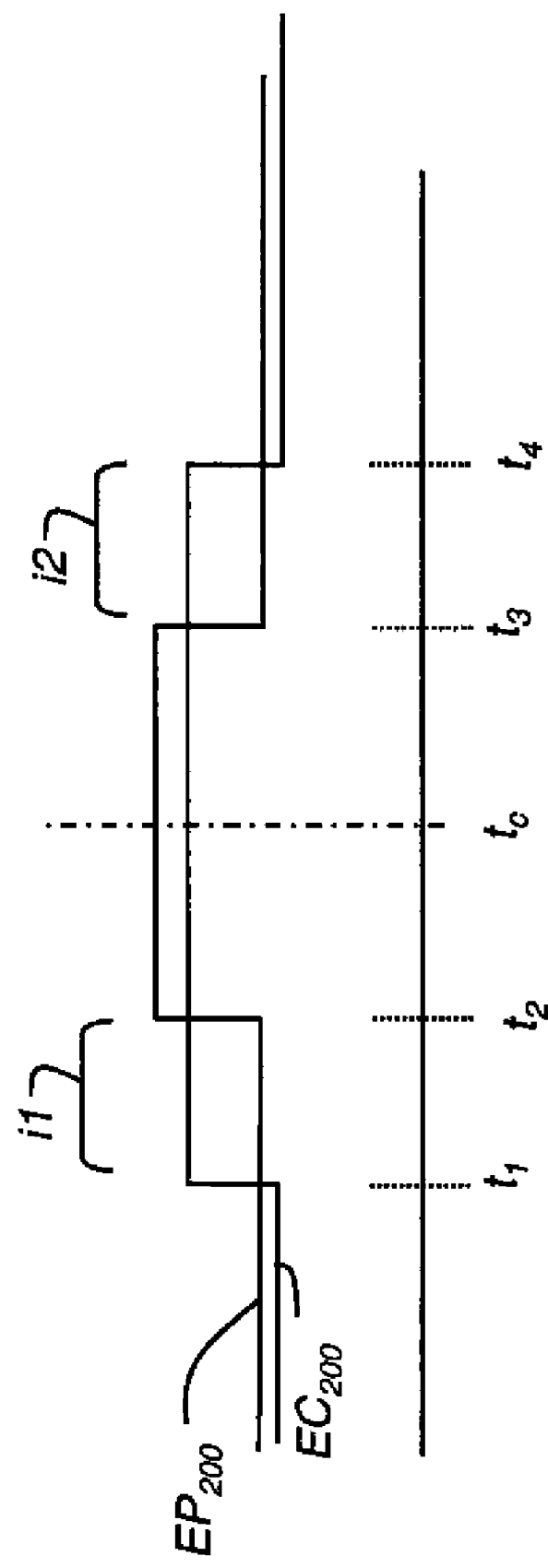

CONCENTRIC EXPOSURE SEQUENCE FOR IMAGE SENSOR

FIELD OF THE INVENTION

The present invention relates to electronic image capture systems and more particularly relates to a readout method for an image sensor array that has independently addressable subsets of pixels.

BACKGROUND OF THE INVENTION

Electronic image sensors such as charge coupled device (CCD) image sensors and active pixel sensor (APS) devices are used in electronic imaging systems for generating an electronic representation of a visual image. APS devices are often fabricated in a Complementary Metal Oxide Semiconductor process and are hence also referred to as CMOS sensors. Typically, these image sensors include a number of light-sensitive pixels (that is, picture elements) arranged in a regular two-dimensional pattern or array of rows and columns, with each individual pixel providing a signal based on the light level of the portion of a scene image projected onto the pixel by a lens.

For considerations of compactness and cost, these image sensors usually include vastly more pixels than analog to digital converters (ADC) to digitize their signals. In order to save space on the sensor chip, it is common practice to provide only enough storage devices to simultaneously read out the pixels of a single row. Consequently, the pixel signals for the complete 2-dimensional sensor cannot be measured or read out simultaneously. Instead, pixel sensor signals are read in a serial fashion. For example, in a CCD having a single ADC, the pixel signals are read out in a raster fashion: pixel-by-pixel within a row, then row-by-row within the array of pixels.

The serial nature of image sensor readout directly controls the rate at which the entire sensor can be read, as limited by the bandwidth of the readout mechanism. For example, if the read-out mechanism of the image sensor can measure 50 million pixels per second, then it would take about one-tenth of a second to read out a 5 megapixel image sensor. Reducing the time required to read the entire image sensor generally requires increasing power consumption for faster read-out, or increasing the size of the image sensor in order to provide additional read-out channels. Neither increased power consumption nor increased size, however, is desirable.

Because it eliminates mechanical components and reduces cost and space requirements, it is a common practice to design an image capture system having no light-blocking shutter. Such systems rely instead on sensor timing that effectively provides an electronic shutter. This timing scheme operates by resetting each photosensor, integrating photo-electrons (or, alternately, holes), and then reading out the photosensor signal in an ordered sequence. The reset step can be accomplished by transferring residual charge from a photodiode to associated floating diffusion circuitry and then discarding the residual charge. During exposure, the photo-electrons accumulate in the photodiode for the prescribed integration time, at which point the charge signal is transferred into the floating diffusion. In CMOS devices, the charge signal is converted to a voltage. The associated voltage is then stored in a memory device such as a capacitor.

If the sensor has sufficiently low dark current and sufficiently good light shielding for the floating diffusion, then the transferred charge need not be read out immediately. Under these conditions, it would be possible to transfer the charge from all pixels at once into their respective floating diffusions and then to wait for a short time as the sequential read-out sequence progressively processes the signals, row by row. Of course, for such a global transfer to work, each pixel would also need to have its own light-shielded floating diffusion.

An alternative image sensor readout arrangement, provided particularly by APS image sensors, allows exposure and readout of the image sensor to occur progressively row-by-row across the rows of the image sensor. This "rolling shutter" sequence avoids the differential exposure problem exhibited in the interlaced fields of a CCD, making the exposure for each row extend for the same length of time. As an additional advantage, the rolling shutter sequence simplifies sensor component design, since shielded storage is not required for each pixel. However, since the exposure for each row is independent from the exposures of the other rows and occurs in a sequential (or rolling) fashion with the exposures of the other rows, each successive row captures its portion of a scene image at a slightly later time than the preceding row. Consequently, relative motion between the scene (or elements of the scene) and the image sensor causes objects within the scene to appear distorted in the image captured by the image sensor. This effect, termed image "shear", is characteristic of rolling shutter arrangements. For example, if such a so-called rolling shutter or electronic focal plane shutter image sensor is used to capture an image of an automobile moving horizontally, the automobile moves relative to the image sensor as each row of the captured image is exposed and read out, so that each row of the captured image shows the vehicle at a different position. This can cause round car tires to appear to be somewhat oval, and distort rectangular car windows to appear as parallelograms. This distortion due to motion is a direct consequence of the amount of time required to read out all the rows of the image sensor. If the rows can be read at a faster rate, then this distortion can be reduced. As noted previously, however, increasing the readout rate generally requires an undesirable increase in cost and power consumption for the image sensor.

For silicon-based image sensors, the pixel components themselves are broadly sensitive to visible light, permitting unfiltered pixels to be suitable for capturing a monochrome image. For capturing color images, a two-dimensional pattern of filters is typically fabricated on the pattern of pixels, with different filter materials used to make individual pixels sensitive to only a portion of the visible light spectrum. An example of such a pattern of filters is the well-known Bayer color filter array (CFA) pattern, as described in U.S. Pat. No. 3,971,065. Though the Bayer CFA has advantages for obtaining full color images under typical conditions, however, this solution has been found to have its drawbacks. Although filters are needed to provide narrow-band spectral response, any filtering of the incident light tends to reduce the amount of light that reaches each pixel, thereby reducing the effective light sensitivity of each pixel and reducing pixel response speed.

As solutions for improving image capture under varying light conditions and for improving overall sensitivity of the imaging sensor, modifications to the familiar Bayer pattern have been disclosed. For example, commonly assigned U.S. Patent Application Publication No. 2007/0046807 entitled "Capturing Images Under Varying Lighting Conditions" by Hamilton et al. and U.S. Patent Application Publication No. 2007/0024931 entitled "Image Sensor with Improved Light Sensitivity" by Compton et al. both describe alternative sensor arrangements that combine color filters with panchromatic filter elements, spatially interleaved in some manner. With this type of solution, some portion of the image sensor detects color; the other panchromatic portion is optimized to detect light spanning the visible band for improved dynamic range and sensitivity. These solutions thus provide a pattern of pixels, some pixels with color filters (providing a narrow-band spectral response) and some without (unfiltered "panchromatic" pixels or pixels filtered to provide a broad-band spectral response).

Using a combination of both narrow- and wide-spectral band pixel responses, image sensors can be used at lower light levels or provide shorter exposure times. See, for example, Sato et al. in U.S. Pat. No. 4,390,895, Yamagami et al. in U.S. Pat. No. 5,323,233, and Gindele et al. in U.S. Pat. No. 6,476, 865.

Configurations with both color and panchromatic pixels can help to compensate for some of the problems caused by color filtering, particularly with respect to reduced light sensitivity and motion blur. However, when using conventional pixel readout timing sequences, correction of motion problems, caused by the time delay between exposure intervals for panchromatic and color capture over the same portion of the image sensor, requires that motion estimation or other compensation techniques be implemented. Thus, sophisticated software can be required for taking full advantage of implementations using both color and panchromatic pixels, adding cost and complexity to imaging device designs.

There is, then, a need for improved readout methods that reduce or eliminate the requirements for motion estimation and compensation when using a digital imaging sensor array.

SUMMARY OF THE INVENTION

The present invention addresses the problem of sensor readout timing when using various sensor arrangements, both where all pixels in the array have associated color filters and where there are both panchromatic and color pixels in the array. In accordance with the present invention, there is provided a method for image capture comprising:

(a) providing an image sensor having at least one segmented row of pixels, wherein the at least one segmented row comprises at least first and second disjoint row subsets of pixels, wherein the reset and readout operations for each row subset are controllably independent of each other;

(b) timing the exposure interval of the first subset to be photographically centered with the exposure interval of the second subset; and (c) combining the image data obtained from the first and second row subset exposures to form a row of pixel values.

Image capture in accordance with the present invention is particularly suitable for image capture devices that capture still and video images. The present invention has a broad application and numerous types of image capture devices can effectively use these image capture methods.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 2 is conventional Bayer color filter array pattern showing a minimal repeating unit and a non-minimal repeating unit;

FIG. 5A is a portion of a conventional Bayer color filter array pattern showing segmentation of one row into disjoint row subsets;

FIG. 7 is a plan view showing a number of patterns for pixel arrangements where both color and panchromatic pixels are used;

FIG. 12A is a timing diagram that shows a portion of the readout sequence for the method of the present invention in one embodiment;

FIG. 12D is a timing diagram showing concentric exposure for panchromatic and color pixels;

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

In the context of the present disclosure, the term "partition" has the meaning used in mathematical set theory. A partition of a set S is a collection of disjoint proper, non-empty subsets whose union is the complete set S. It can be observed that this more formal definition of partition differs somewhat in connotation from casual use of the term. However, the formal definition assigned by mathematical set theory is particularly appropriate for defining how pixels in an array are organized using the method and apparatus of the present invention, as is described in more detail subsequently.

The term "subset", unless otherwise explicitly stated, is used herein to refer to a non-empty subset. For a set S, a subset may comprise the complete set S. A "proper subset" of set S, however, is strictly contained in set S and excludes at least one member of set S. Two subsets are disjoint if their intersection is the empty set, that is, if they have no elements in common.

Figure 1:
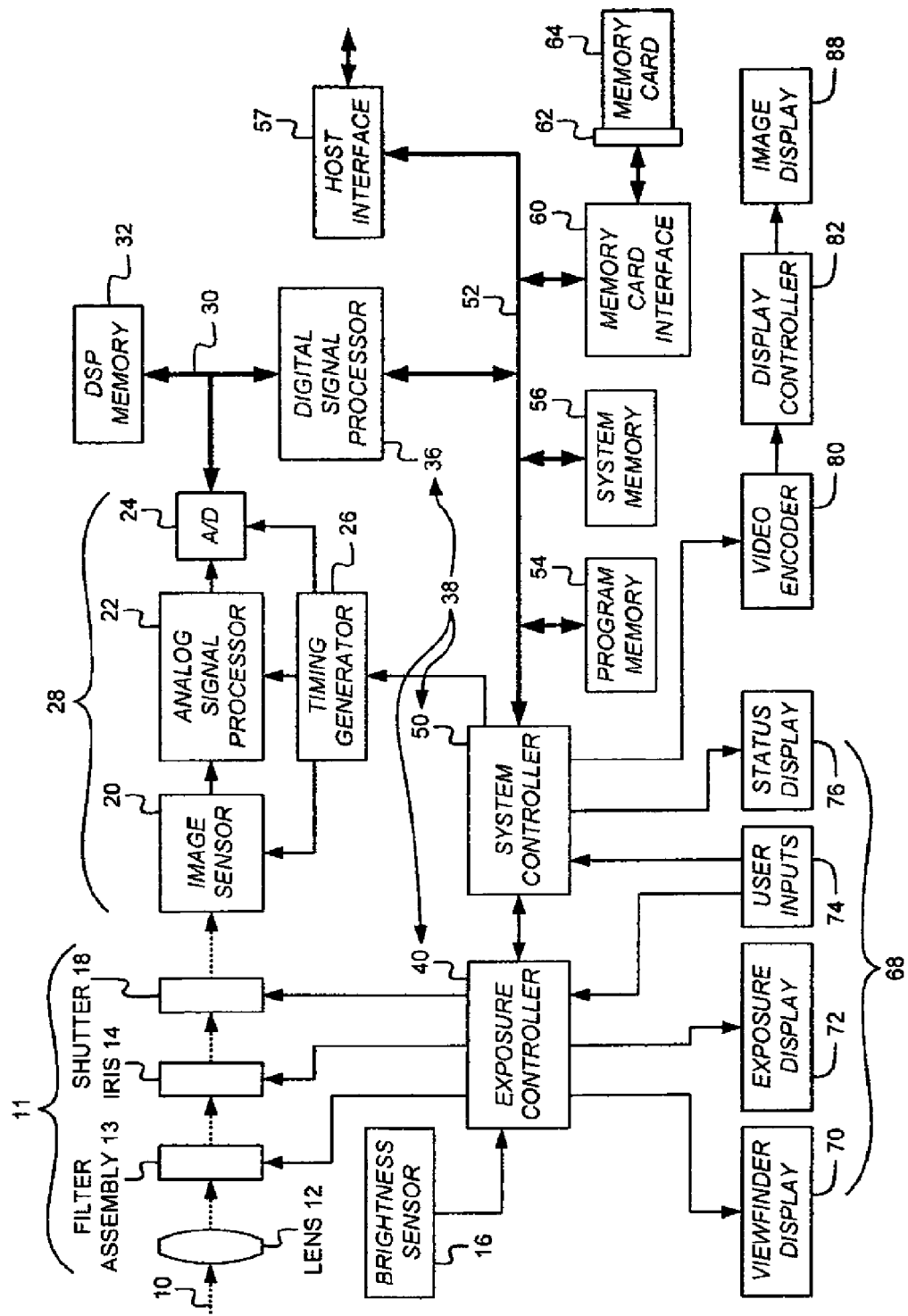
FIG. 1 is a block diagram of a conventional digital still camera system that can employ a conventional sensor and processing methods or the sensor and processing methods of the current invention.

Turning now to FIG. 1, a block diagram of an image capture device shown as a digital camera embodying the present invention is shown. Although a digital camera will now be explained, the present invention is clearly applicable to other types of image capture devices, such as on imaging subsystems included in non-camera devices such as mobile phones and automotive vehicles, for example. Light 10 from the subject scene is input to an imaging stage 11, where the light is focused by a lens 12 to form an image on a solid state image sensor 20. Image sensor 20 converts the incident light to an electrical signal for each picture element (pixel). The image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process). For color imaging, the image sensor 20 includes an arrangement of color filters, as described in more detail subsequently.

An iris block 14 varies the aperture. A neutral density (ND) filter block 13 includes one or more ND filters interposed in the optical path. These blocks regulate the amount of light reaching the image sensor 20. Also regulating the overall light level is the time that a shutter 18 is open. An exposure controller 40 responds to the amount of light available in the scene as metered by a brightness sensor 16 and controls all three of these regulating functions.

The analog signal from image sensor 20 is processed by an analog signal processor 22 and applied to an analog to digital (A/D) converter 24. A timing generator 26 produces various clocking signals to select rows and pixels and synchronizes the operation of analog signal processor 22 and A/D converter 24. An image sensor stage 28 includes the image sensor 20, the analog signal processor 22, the A/D converter 24, and the timing generator 26. The functional elements of image sensor stage 28 can be separately fabricated integrated circuits, or can be fabricated as a single integrated circuit as is commonly done with CMOS image sensors. The resulting stream of digital pixel values from A/D converter 24 is stored in a memory 32 associated with a digital signal processor (DSP) 36.

DSP 36 is one of three processors or controllers in this embodiment, in addition to a system controller 50 and exposure controller 40. Although this distribution of camera functional control among multiple controllers and processors is typical, these controllers or processors are combined in various ways without affecting the functional operation of the camera and the application of the present invention. These controllers or processors can include one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software necessary for practicing image processing. Memory 32 includes of any type of random access memory, such as SDRAM. A bus 30 including a pathway for address and data signals connects DSP 36 to its related memory 32, A/D converter 24, and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on an image display 88.

A bus 52 includes a pathway for address, data and control signals, and connects system controller 50 to DSP 36, program memory 54, system memory 56, host interface 57, memory card interface 60, and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Compact Flash (CF) card inserted into a socket 62 and connected to the system controller 50 via a memory card interface 60. Other types of storage that are utilized include, without limitation, PC-Cards, MultiMedia Cards (MMC), or Secure Digital (SD) cards.

Processed images are copied to a display buffer in system memory 56 and continuously read out via a video encoder 80 to produce a video signal. This signal is output directly from the camera for display on an external monitor, or processed by a display controller 82 and presented on image display 88. This display is typically an active matrix color liquid crystal display (LCD), although other types of displays are used as well.

The user interface, including all or any combination of a viewfinder display 70, an exposure display 72, a status display 76 and image display 88, and user inputs 74, is controlled by a combination of software programs executed on exposure controller 40 and system controller 50. User inputs 74 typically include some combination of buttons, rocker switches, joysticks, rotary dials or touchscreens. Collectively, a viewfinder display 70, an exposure display 72, a status display 76, and user inputs 74 are referred to as a user interface 68. Image display 88 can also be considered part of the user interface 68. Exposure controller 40 operates light metering, exposure mode, autofocus and other exposure functions. The system controller 50 manages the graphical user interface (GUI)

presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. Digital still cameras can have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment can be selected to reduce the cost, add features or improve the performance of the camera. For example, an autofocus system is added, or the lens is detachable and interchangeable. It will be understood that the present invention is applied to any type of digital camera or, more generally, digital image capture apparatus, where alternative modules provide similar functionality.

The method of the present invention requires that some number of rows of pixels in image sensor 20 be segmented so that the row contains two or more subsets of pixels, wherein each subset is capable of independent reset and read operations which respectively begin and end exposure, as controlled by timing generator 26. This is not a capability provided with many conventional image sensor devices. However, design of image sensor 20 hardware having this capability is within the scope of skills of those who practice the art of image sensor design and fabrication. A sensor with this capability is a sensor with segmented rows of pixels.

Given the illustrative example of FIG. 1, the following description will then describe in detail the operation of this camera for capturing images according to the present invention. Whenever general reference is made to an image sensor in the following description, it is understood to be representative of image sensor 20 from FIG. 1. Image sensor 20 shown in FIG. 1 typically includes a two-dimensional array of light sensitive pixels fabricated on a silicon substrate that convert incoming light at each pixel into an electrical signal that is measured. In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values, either limited to one primary color (using filters) or generally panchromatic. The term color pixel will refer to a pixel having a color photoresponse over a relatively narrow spectral band.

As image sensor 20 is exposed to light, free electrons are generated and captured within the electronic structure at each pixel. Capturing these free electrons for some period of time and then measuring the number of electrons captured, or measuring the rate at which free electrons are generated, can measure the light level at each pixel. In the former case, accumulated charge is shifted out of the array of pixels to a charge-to-voltage measurement circuit as in a charge-coupled device (CCD), or the area close to each pixel can contain elements of a charge-to-voltage measurement circuit as in an active pixel sensor (APS or CMOS sensor).

It should be observed that these same principles work for both basic sensor types, those that capture and use photo-electrons or those that capture and use photo-generated holes.

Figure 2:
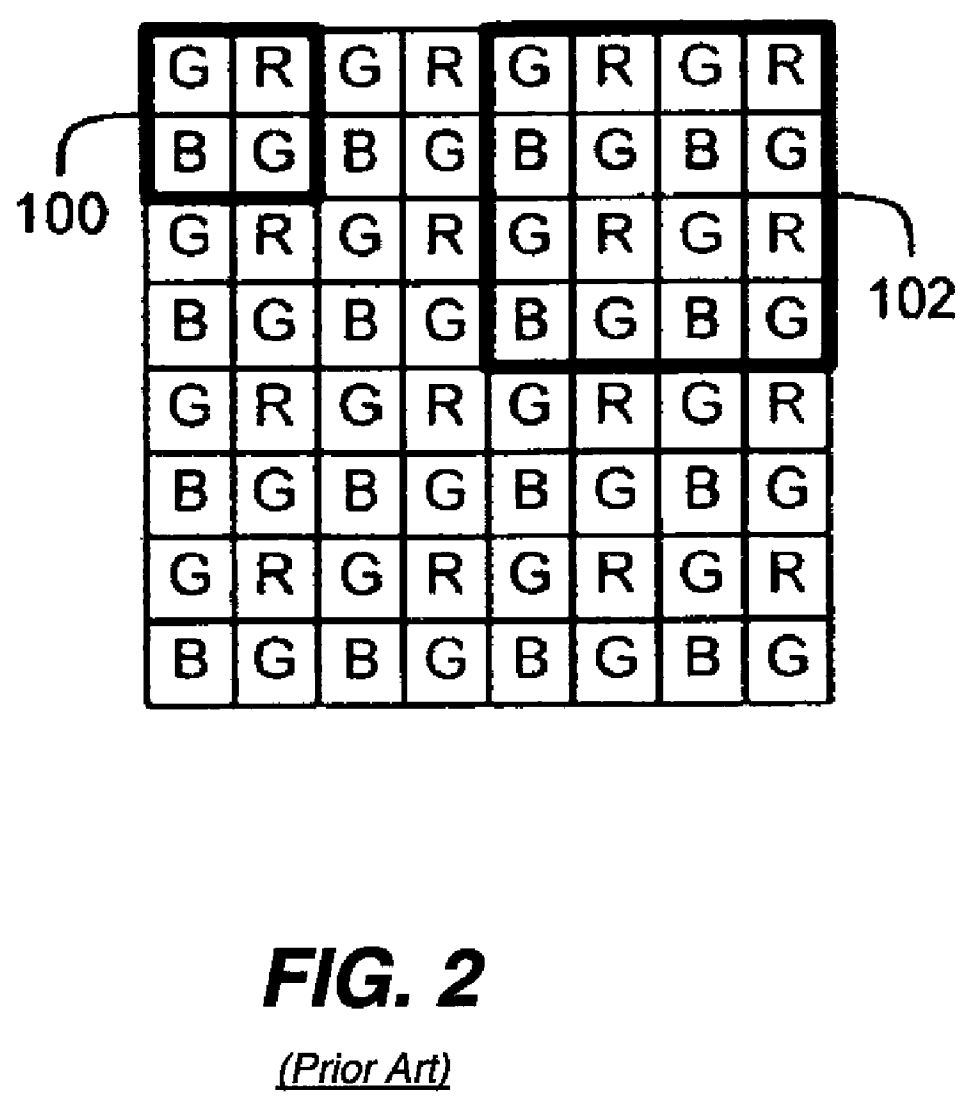

In order to produce a color image, the array of pixels in an image sensor typically has an overlaid pattern of color filters placed over the pixels. FIG. 2 shows a pattern of red (R), green (G), and blue (B) color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum.

A minimal repeating unit is a repeating unit such that no other repeating unit has fewer pixels. For example, the CFA in FIG. 2 includes a minimal repeating unit that is two pixels by two pixels as shown by pixel block 100 in FIG. 2. Multiple copies of this minimal repeating unit are tiled to cover the entire array of pixels in an image sensor. The minimal repeating unit is shown with a green pixel in the upper right corner, but three alternative minimal repeating units can easily be discerned by moving the heavy outlined area one pixel to the right, one pixel down, or one pixel diagonally to the right and down. Although pixel block 102 is a repeating unit, it is not a minimal repeating unit because pixel block 100 is a repeating unit and pixel block 100 has fewer pixels than pixel block 102.

An image captured using an image sensor having a two-dimensional array with the CFA of FIG. 2 has only one color value at each pixel. In order to produce a full color image, there are a number of techniques for inferring or interpolating the missing colors at each pixel. These CFA interpolation techniques are well known in the art and reference is made to the following patents: U.S. Pat. Nos. 5,506,619; 5,629,734, and 5,652,621.

Each pixel of image sensor 20 has both photodetector and active transistor circuitry for readout of the pixel signal. The photodetector for each pixel in the image sensor array converts photons impinging on the pixel to an electric charge by the photoelectric effect. The charge is integrated over a period of time that is long enough to collect a detectable amount of charge but short enough to avoid saturating storage elements. This integration time period is analogous to a film exposure time (that is, shutter speed).

The timing of image capture can follow one of two basic patterns. In a global capture sequence, exposure signal values for all image pixels are simply read at the same time. However, this type of sequence requires considerable device complexity and can be disadvantageous because it constrains the amount of space on the sensor chip for photo-receptivity. Instead, a row-by-row reading method has been adopted and is often the preferred mode of reading for CMOS APS pixels.

In the image sensor array of a CMOS APS device, the integration time, alternately termed the exposure time, is the interval between a reset of a given row of pixels that begins exposure and a subsequent read or readout of that row that ends exposure. Since only one row can be selected at a time, the reset/read routine is sequential (i.e. row by row). This reading technique is referred to as a "rolling electronic shutter" or, more simply, "rolling shutter" mode and is well known in the imaging art. A few examples of variations on rolling shutter time sequencing are given in U.S. Pat. No. 6,115,065 entitled "Image Sensor Producing at Least Two Integration Times from Each Sensing Pixel" to Yadid-Pecht et al. and in U.S. Pat. No. 6,809,766 entitled "Look-Ahead Rolling Shutter System in CMOS Sensors" to Krymski et al. The effective shutter width for the read sequence relates to the time between integration enable and readout. This can be of variable size depending on the number of adjacent pixels that have the same integration time. The shutter width, having one or more rows read at a time, can also be adjusted by a fixed value to control the gain of an exposed area of a sensor array. As one method for rolling shutter sequencing, a reset pointer is indexed ahead of a read pointer by an amount equal to the shutter width. The time difference between the two pointers corresponds to the pixel integration time.

Figure 3A:
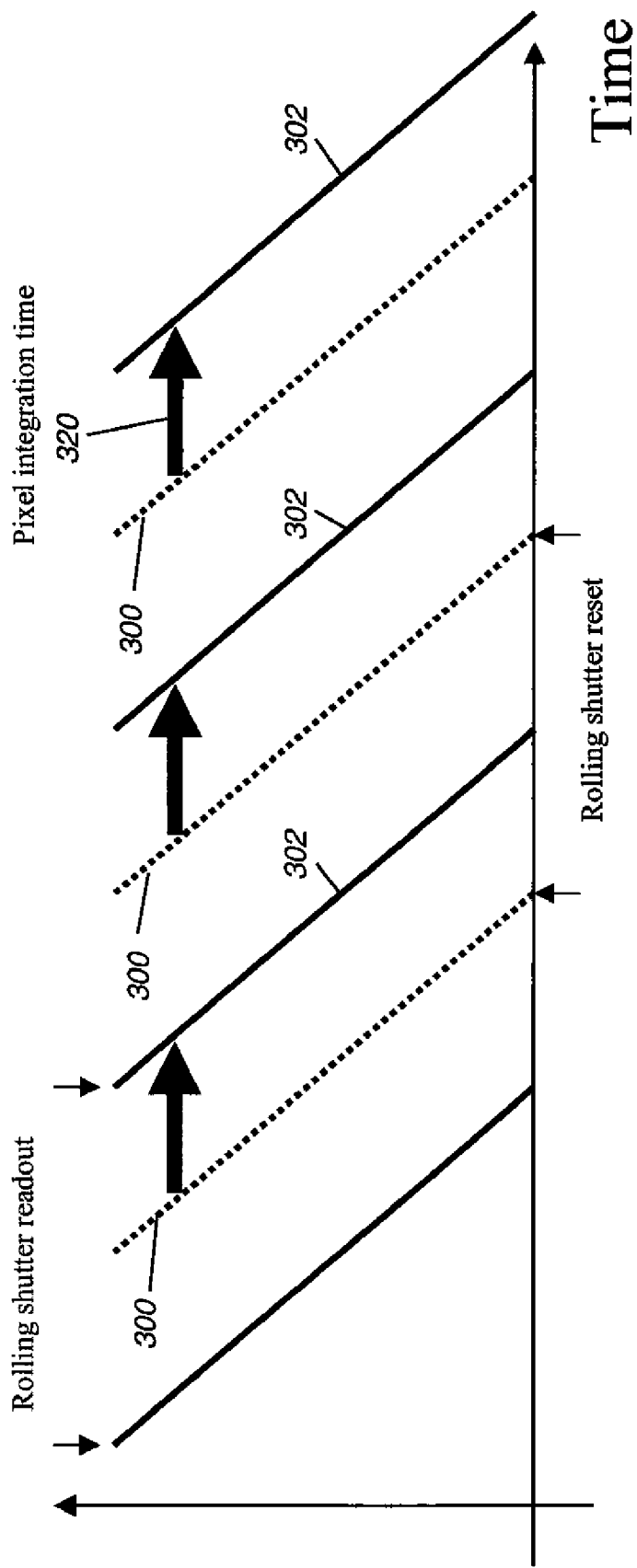
FIGS. 3A and 3B show conventional timing diagrams for rolling shutter operation under various light conditions.

FIG. 3A shows a timing sequence for the rolling shutter mode as is conventionally represented, under conditions of relatively good illumination in this example. The abscissa (x-axis) represents time. Each slanted line indicates reading of one shutter width (for example, one or more rows). A reset 300 is performed for each row in sequence. A bold arrow indicates the pixel integration time 320. After a suitable integration time, a read 302 is performed for the row(s).

Figure 3B:
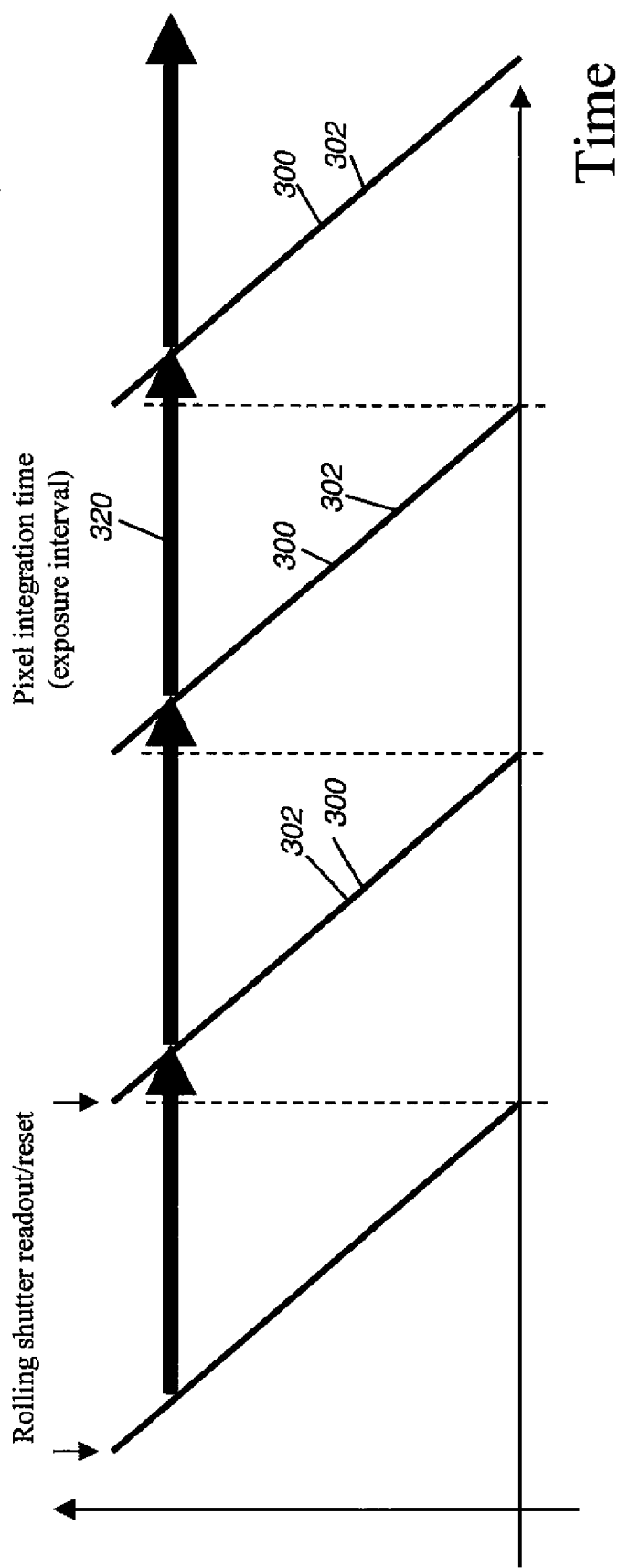

As can be seen from the timing diagram of FIG. 3A, this conventional rolling shutter sequence allows periods during which no photons are obtained, specifically, between a read 302 and its subsequent reset 300. A bold arrow indicates the pixel integration interval 320. Although this can be acceptable under good illumination, this arrangement will not perform well under low-light conditions. This is because more pixel integration time can be necessary as light intensity decreases. The timing diagram of FIG. 3B shows timing for low-light conditions. Here, reset 300 is performed immediately following read 302, maximizing the pixel integration time so that incident photons are not wasted.

The rolling shutter technique permits multiple rows of pixels to feed image signals to the same data conversion components. Even with the adoption of rolling shutter techniques, however, the task of reading the image sensor efficiently still has shortcomings. Shear motion artifacts are one type of problem, as noted earlier. Low-light performance can still be improved. And image dynamic range can still be less than what is desired.

One type of solution addressing this problem is the use of some portion of sensor array pixels as panchromatic pixels. For example, commonly assigned U.S. Patent Application Publication No. 2007/0024931 entitled "Image Sensor with Improved Light Sensitivity" by Compton et al. discloses an image sensor having both color and panchromatic pixels. In the context of the present disclosure, the term panchromatic pixel refers to a pixel having a generally panchromatic photoresponse, with a wider spectral sensitivity than the narrower spectral sensitivities represented in the selected set of color photoresponses. That is, a panchromatic pixel can have high sensitivity to light across the entire visible spectrum. Although the panchromatic pixels generally have a wider spectral sensitivity than the set of color photoresponses, each panchromatic pixel can also have an associated filter. Such filter can be either a neutral density filter or a color or bandwidth filter.

Figure 4:
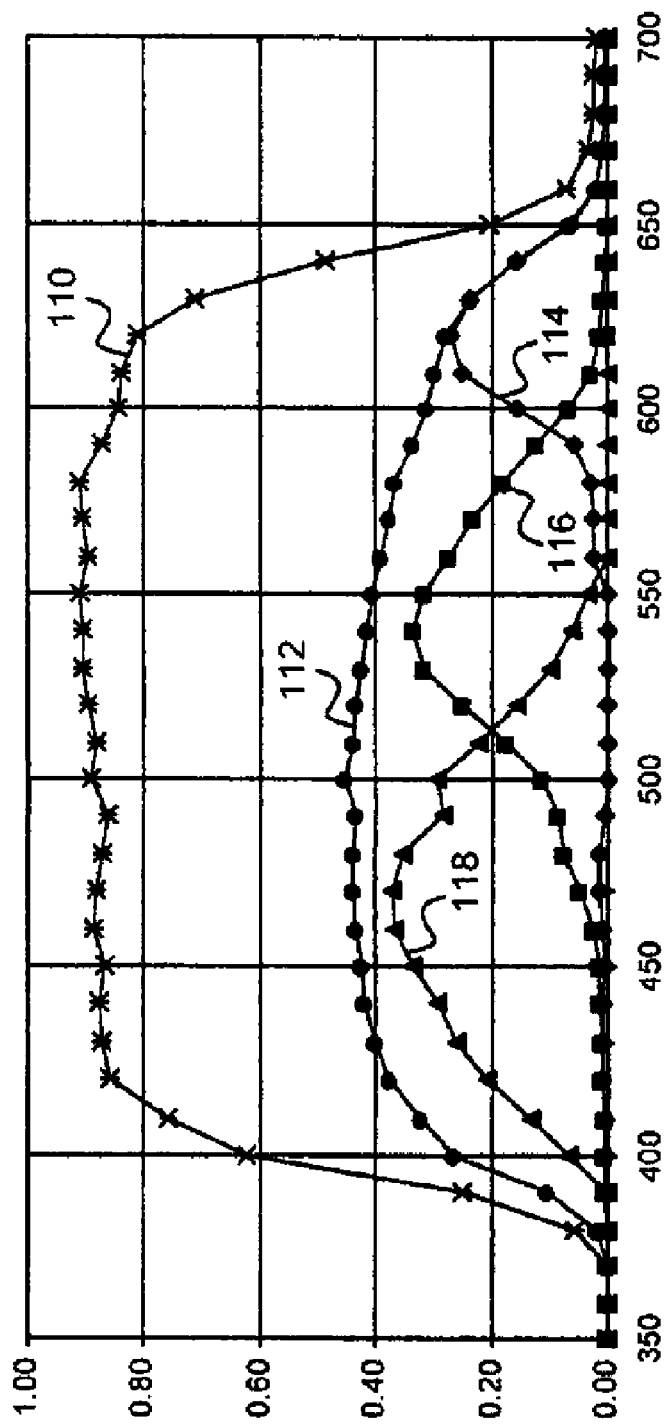
FIG. 4 provides representative spectral quantum efficiency curves for red, green, and blue pixels, as well as a wider spectrum panchromatic quantum efficiency, all multiplied by the transmission characteristics of an infrared cut filter.

Referring to the graph of FIG. 4, there are shown the relative spectral sensitivities of pixels with red, green, and blue color filters in a typical camera application. The X-axis in FIG. 4 represents light wavelength in nanometers, spanning wavelengths approximately from the near ultraviolet to near infrared, and the Y-axis represents efficiency (normalized). In FIG. 4, a curve 110 represents the spectral transmission characteristic of a typical bandwidth filter used to block infrared and ultraviolet light from reaching the image sensor. Such a filter is needed because the color filters used for image sensors typically do not block infrared light, hence the pixels may be unable to distinguish between infrared light and light that is within the passbands of their associated color filters. The infrared blocking characteristic shown by curve 110 thus prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 110 to produce the combined system quantum efficiencies represented by a curve 114 for red, a curve 116 for green, and curve 118 for blue. It is understood from these curves that each color photoresponse is sensitive to only a portion of the visible spectrum. By contrast, the photoresponse of the same silicon sensor that does not have color filters applied (but including the infrared blocking filter characteristic) is shown by a curve 112; this is an example of a panchromatic photoresponse. By comparing the color photoresponse curves 114, 116, and 118 to the panchromatic photoresponse curve 112, it is clear that the panchromatic photoresponse can be two to four times more sensitive to wide spectrum light than any of the color photoresponses.

The method of the present invention is capable of being used with any sensor architecture that allows two or more subsets of pixels to form a partition of a row of pixels, again using the formal definition of partition described earlier. This method provides different exposure durations for each subset within a row, wherein the different exposure durations within a single row are all substantially temporally concentric, that is, centered about the same instant in time. The description that follows begins with a sensor array having a patterned arrangement of color RGB pixels. Subsequent description then deals with how the method of the present invention offers particular benefits when used with an array having both RGB and panchromatic pixels organized into subsets.

The Bayer pattern described earlier with reference to FIG. 2 provides two green pixel sensors (G) in its four-pixel minimal repeating unit, block 100. The higher sensitivity and importance of the green (G) color channels for obtaining luminance in the image can be used to provide enhanced dynamic range for an image capture device.

The method of the present invention involves a number of basic operations, including the following:
  (i) segmenting rows of the image sensor so that each row provides one or more non-overlapping or disjoint row subsets that can be read and reset at different times;
  (ii) timing the corresponding exposure periods of disjoint row subsets that are within the same row so that they are substantially temporally concentric; and
  (iii) combining the image data obtained from each row subset where there are two or more disjoint row subsets.

Figure 5A:
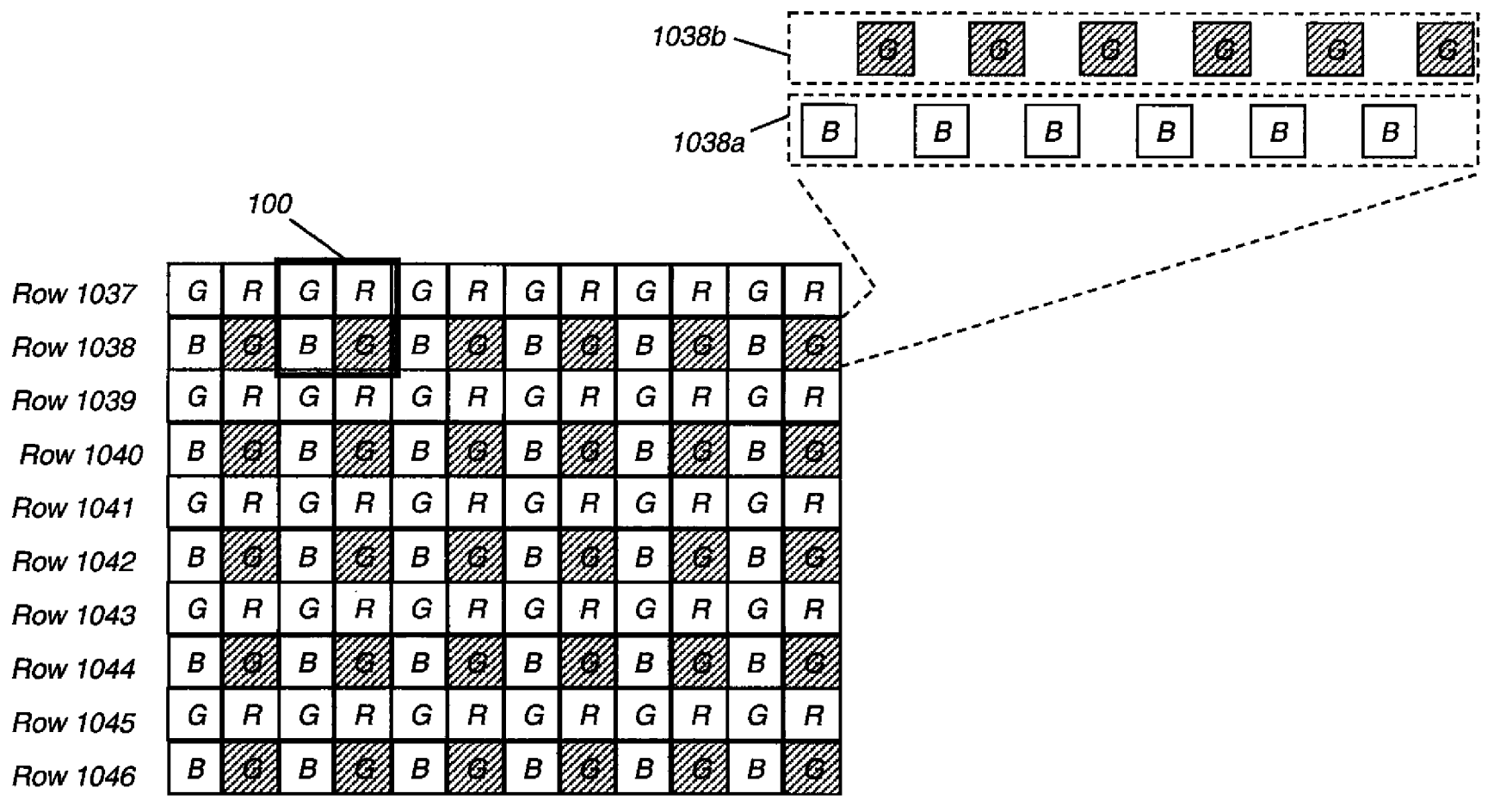

FIG. 5A shows segmentation (i) for a sensor array that is arranged using the Bayer filter pattern. FIG. 5A illustrates a portion of a larger array, showing only rows 1037 through 1046. Within each four-pixel minimal repeating unit of pixel block 100, there are two green G pixels. One of the G pixels in each foursome of pixel block 100, shown shaded in FIG. 5A, is designed for exposure over a longer interval than the other non-shaded G pixel.

The term "row subset" describes a subset of pixels that are all in the same row. By this definition, any row of pixels has at least one row subset (itself), or could have two or more row subsets. Where there are two or more row subsets within a row, the reset and readout operations for each row subset are controllably independent of reset and readout operations for the other row subset(s).

The two disjoint or non-overlapping row subsets for the example sensor arrangement of FIG. 5A are in a pixel row number 1038 and are labeled 1038a and 1038b. Row subset 1038a has only blue (B) pixels. Its adjacent subset 1038b has only G pixels; again, the shading indicates that these G pixels are all intended for longer exposure. This same basic pattern applies for even-numbered rows 1040, 1042, 1044, and so on. That is, each even-numbered row has two row subsets, one with green G pixels (as in 1038b), and the other with blue B pixels (as in 1038a).

Odd-numbered rows of pixels in this example could be considered as not segmented into row subsets. However, applying the formal mathematical definition of a subset given earlier, each of these rows could be considered as segmented into a single row subset: the subset containing all pixels in that row. This is not a proper subset, as formally defined mathematically, but does constitute a valid subset.

Figure 5B:
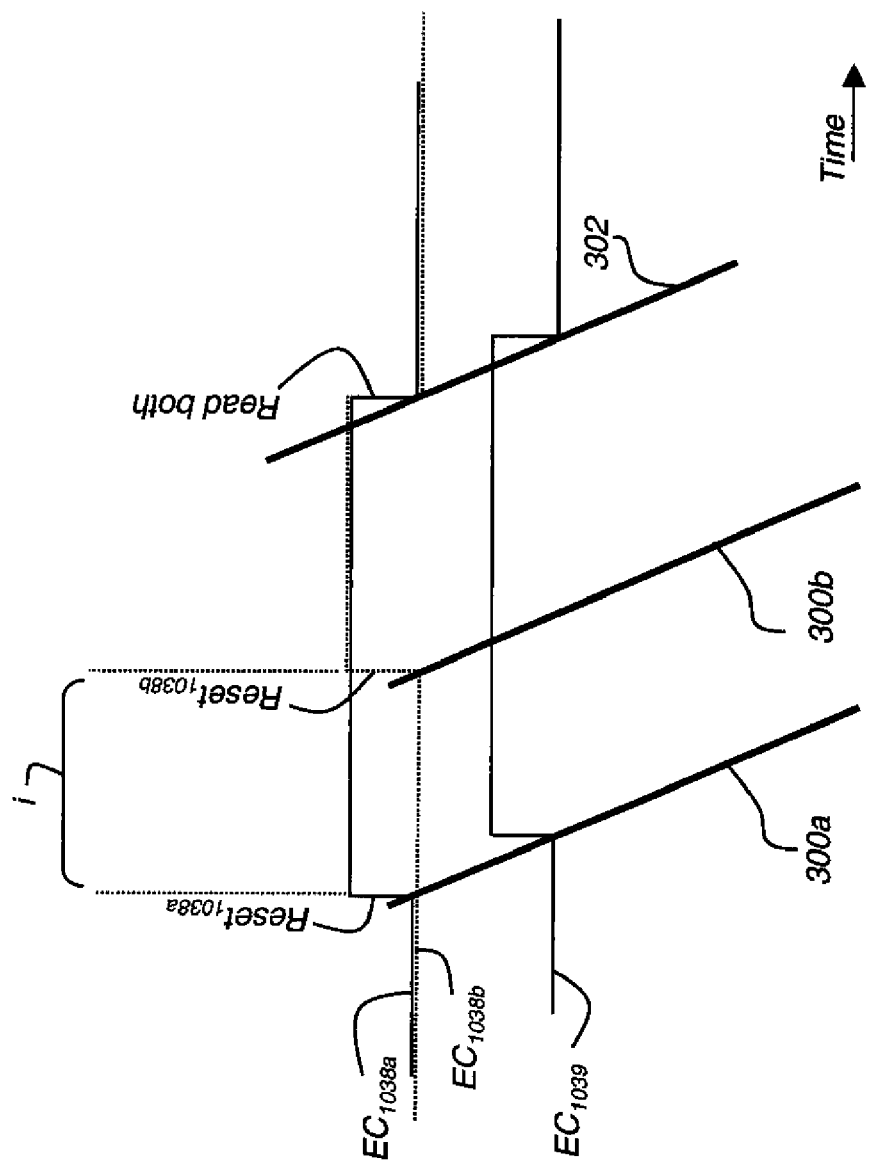
FIG. 5B is a timing diagram for a conventional approach to exposure and readout rolling shutter timing when using two disjoint row subsets.

The partial rolling readout timing diagram of FIG. 5B shows a more conventional timing arrangement that could be used for exposure and read operations with row subsets 1038a and 1038b that are from the same row. As exposure curves $EC_{1038a}$ and $EC_{1038b}$ (shown dotted) indicate, both subsets are read at the same time, but reset at different times, as indicated at $Reset_{1038a}$ and $Reset_{1038b}$. This requires reading the entire row of pixels, including all subsets within the row, at the same time. As with FIG. 3, rolling readout timing requires that each row subset be read out sequentially, so time passes during the readout of the sensor. This is illustrated by the slanted reset lines 300a and 300b and the slanted readout line 302.

As was just described, the next row of pixels in the read sequence, Row 1039, can be considered in either of two ways: (1) as not segmented or (2) as segmented into a single subset. Therefore, its conventional exposure curve $EC_{1039}$ has only a single reset and a single read operation. It should be noted, however, that in an alternate embodiment these odd-numbered rows could themselves be partitioned with a row subset arrangement that is similar to that applied to the even-numbered rows.

The structural and timing solution shown in FIGS. 5A and 5B can be used to provide the advantage of enhanced dynamic range for the image obtained by the sensor. This readout timing works well enough as long as there is no relative movement between the camera and the subject. The timing difference between exposure/integration and readout of the two subsets of color pixels can essentially be ignored where there is no relative movement.

In practice, however, there is generally at least some relative movement between the camera and the subject, particularly in consumer digital camera use and in other consumer imaging applications. This movement can be from motion in the subject scene that is captured as well as due to inadvertent movement from camera jitter, for example. Because exposure/integration times for different subsets can differ in duration and extend over different time periods, as shown in FIG. 5B, there can be at least some slight spatial displacement between image content obtained from these different subsets within the same row when using this conventional rolling shutter timing sequence. That is, movement in the interval i between $Reset_{1038a}$ and $Reset_{1038b}$ is captured only by the blue (B) pixels of row subset 1038a. Movement errors such as blurring can result unless some type of motion compensation/correction is used.

Figure 6:
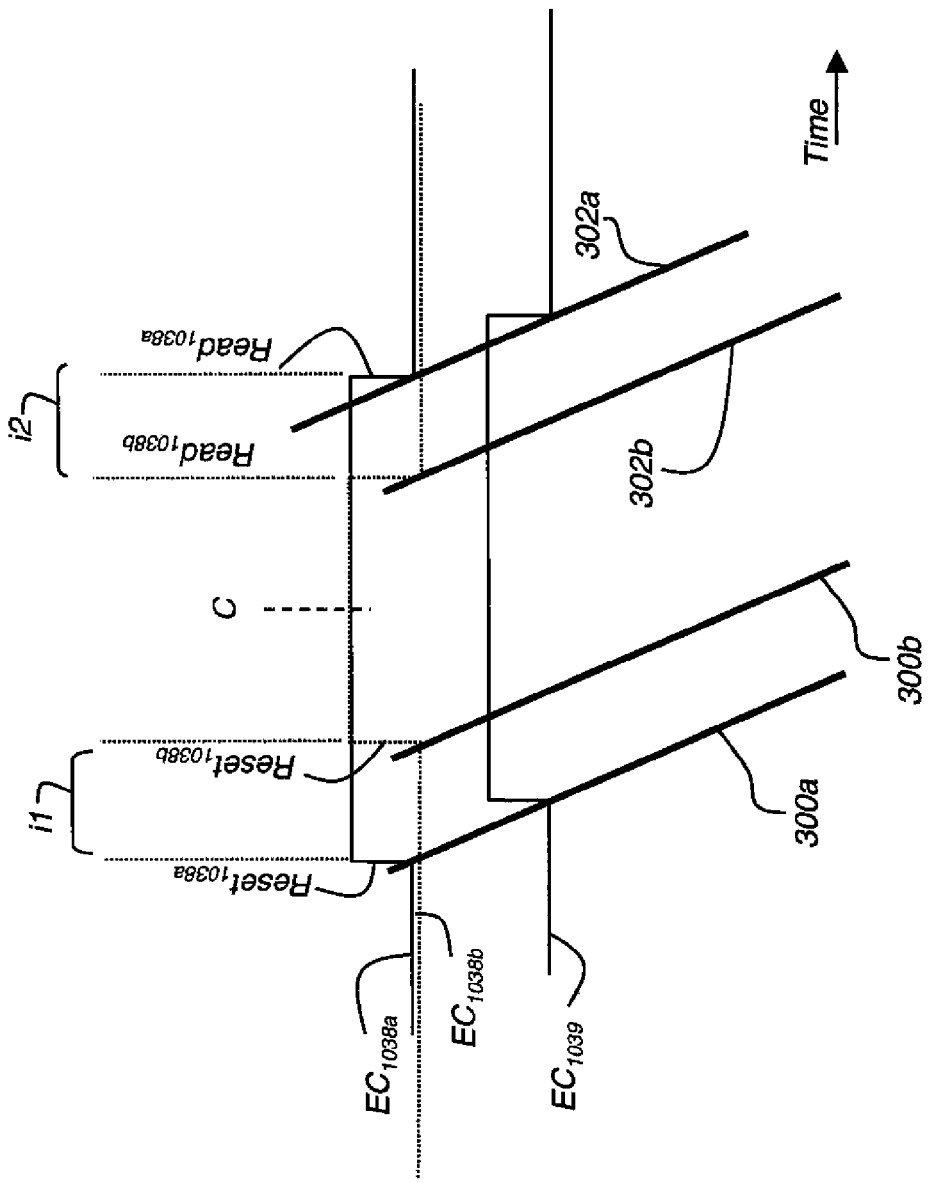
FIG. 6 is a timing diagram showing rolling shutter timing for a segmented row of pixels in one embodiment.

FIG. 6 shows how the exposure period timing method of the present invention (operation (ii) as listed earlier) obviates the motion compensation problem for row subsets having different exposure times. Here, for row 1038 having two row subsets, there are two separate reset operations that begin their respective exposures, $Reset_{1038a}$ and $Reset_{1038b}$ and two separate Read operations that end their respective exposures, $Read_{1038a}$ and $Read_{1038b}$. Both exposure curves $EC_{1038a}$ and $EC_{1038b}$ are concentric, substantially centered about the same time C. This means that intervals i1 and i2 between the respective reset and read operations for this row of pixels are substantially equal, to within some measurable tolerance. As with FIG. 3 and FIG. 5B, rolling readout timing requires that each row subset be read out sequentially, so time passes during the readout of the sensor. This is illustrated by the slanted reset lines 300a and 300b and the slanted readout lines 302a and 302b.

Exposures having the concentric timing relationship of FIG. 6 are "photographically centered". More precisely, a longer exposure period (E1) and a shorter exposure period (E2) are photographically centered when both:

(a) the shorter interval (E2) is begun (reset) after the longer interval (E1) begins and is ended (read) before the longer interval ends; and
(b) when the interval between their resets (i1) is substantially equal to the interval between their read operations (i2), satisfying:

$$\frac{|i1 - i2|}{E1} < 20\%$$

This is equivalent to stating that the durations of the first interval and second interval are equal to within at least 20% of the duration of the first exposure:

$$|i1-i2|<(0.2)E1$$

Accurate motion compensation is most readily achieved where i1 equals i2.

In addition to working with the Bayer CFA configuration, the embodiment described with respect to FIG. 6 can be used with image sensors using color arrays that have any of a number of other color filter arrangements. In this way, different subsets of color pixels can be used with advantage to broaden the dynamic range, to compensate for different filter efficiencies, and to compensate for motion during image capture.

The method described with particular reference to FIG. 6 can be further extended for use with sensors that have both color and panchromatic pixels. Subsequent description shows how row subset exposure timing is very similar for a combined color-panchromatic pixel architecture.

The use of both color and panchromatic pixels provides a number of benefits. Referring back to the sensitivity graph of FIG. 4, it has been found that the overall sensitivity of an image sensor can be improved by intermixing pixels that include color filters with pixels that do not include color filters. When this is done, as seen from FIG. 4, the color filter pixels are significantly less sensitive than are the panchromatic pixels. In this situation, if the panchromatic pixels are properly exposed to light such that the range of light intensities from a scene cover the full measurement range of the panchromatic pixels, then the color pixels will be significantly underexposed. Hence, it is advantageous to adjust the sensitivity of the color filter pixels so that they have roughly the same sensitivity as the panchromatic pixels. The sensitivities of the color pixels are increased, for example, by increasing the size of the color pixels relative to the panchromatic pixels, with an associated reduction in spatial pixels. Timing for color and panchromatic signals can also be adjusted, as described subsequently.

Figure 7:
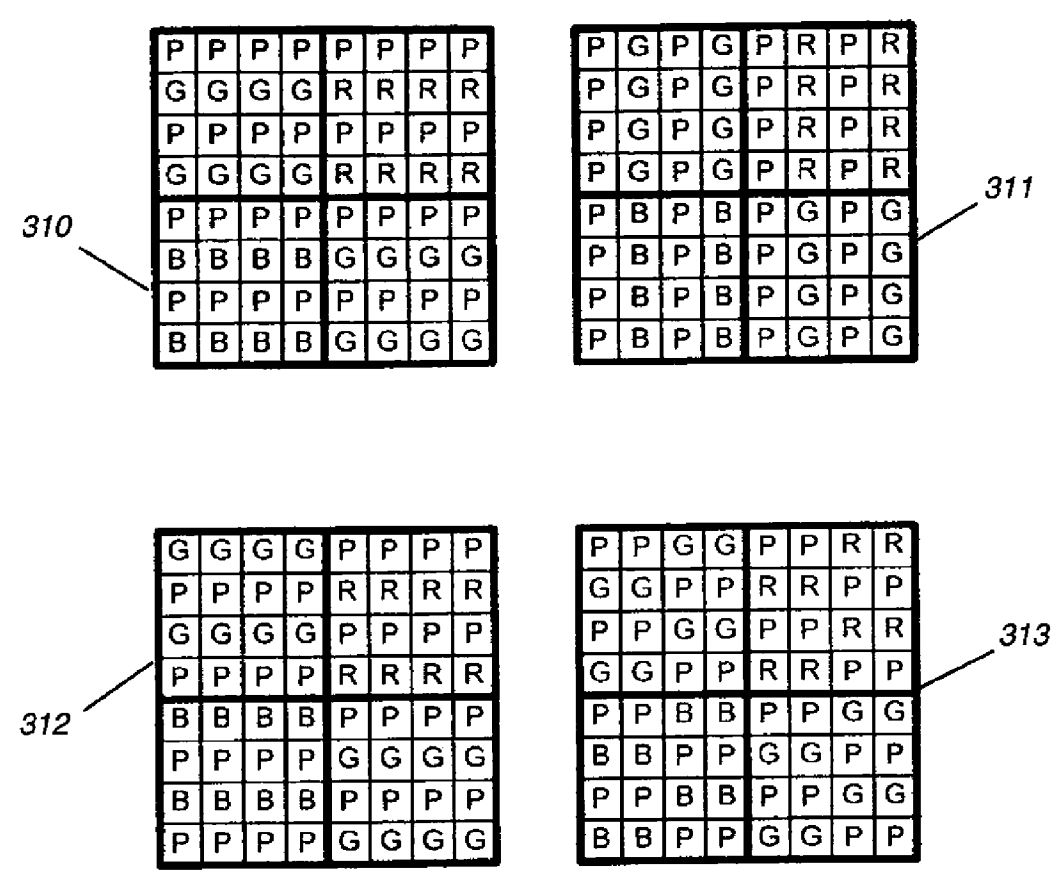
Figure 8A:
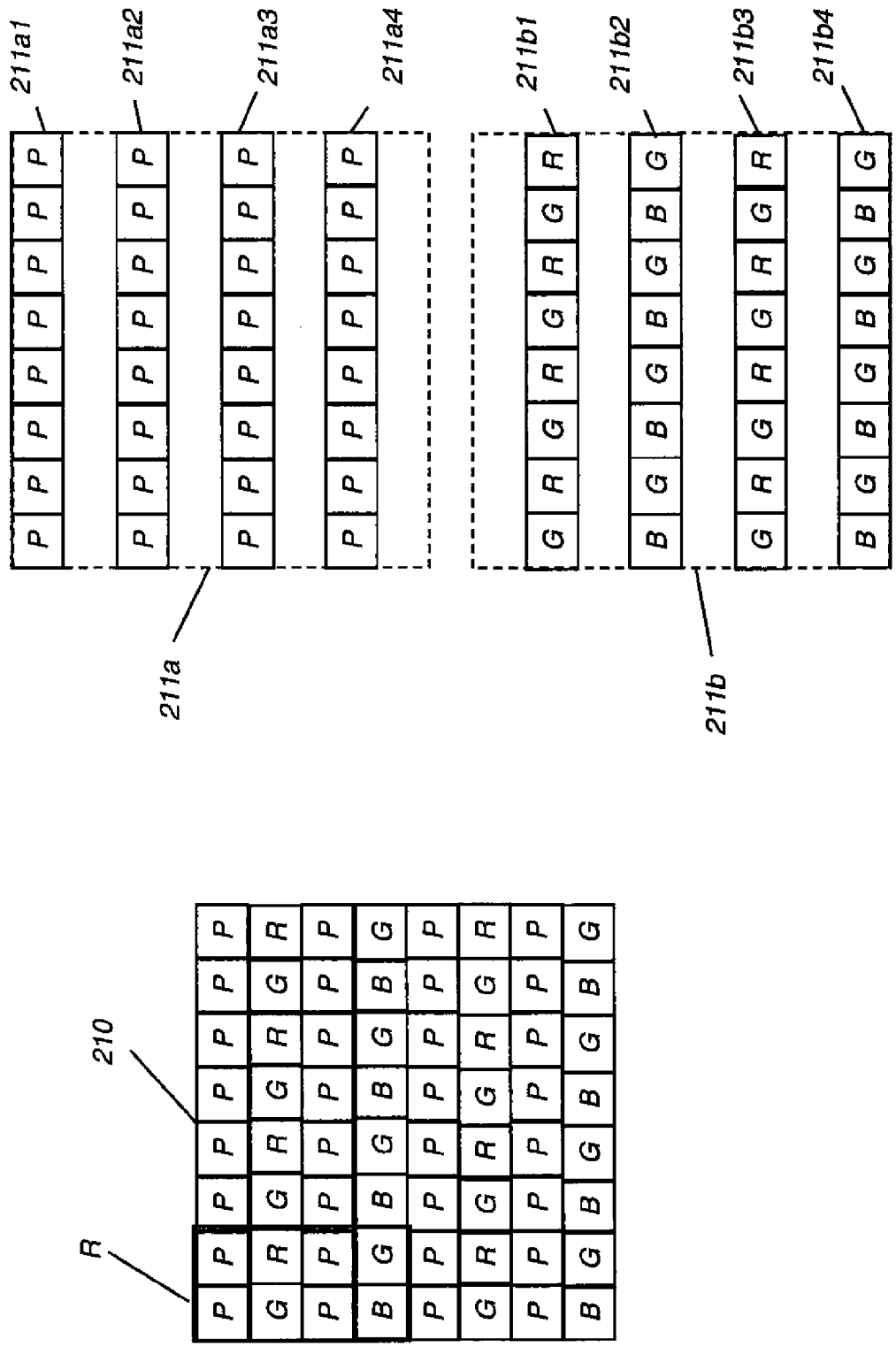
FIG. 8A is a plan view showing an example of components that form a partition of a pixel array.
Figure 8B:
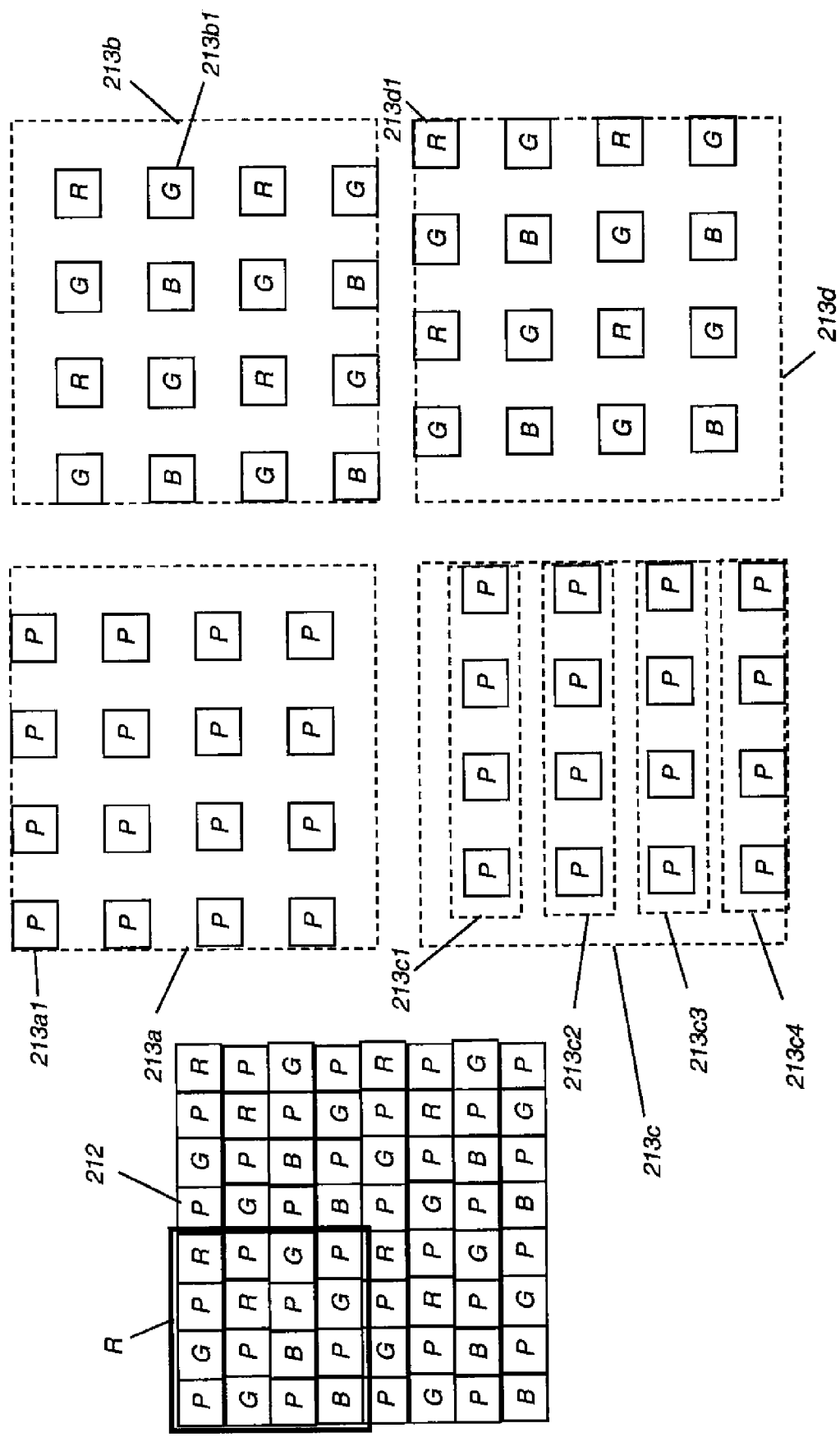
FIG. 8B is a plan view showing another example of components that form a partition of a pixel array.

Subsequent FIGS. 7, 8A, and 8B show various pixel arrangements or patterns that can be used for an imaging sensor that uses panchromatic (Pan or P) and Red (R), Green (G), and Blue (B) pixels. Of course, it should be noted that the patterns shown for the full array and for any of its subsets in these figures represent pixel arrangements, patterns that can be repeated hundreds of times within a single sensor array.

FIG. 7 shows the use of a combination of panchromatic pixels, indicated P in the array patterns shown, with R, G, and B pixels in various patterns, labeled 310, 311, 312, and 313. As can readily be appreciated, numerous patterns can be used, including those that use repeating units, as was described earlier with reference to FIG. 2. Pattern 310, for example, uses alternating rows of color RGB pixels, in an expansion of the Bayer pattern, with interleaved rows of panchromatic P pixels.

FIG. 8A shows how a pattern 210 can be organized into two non-empty component subsets 211a and 211b. FIG. 8B shows how an alternate pattern 212 can be formed from four non-empty component subsets 213a, 213b, 213c, and 213d. As the term is used in this disclosure, a "component subset" is a non-empty proper subset that spans multiple rows of pixels. Component subsets for an image sensor array are disjoint, that is, the intersection of component subsets of the imaging array is the empty set. Component subsets can themselves be further divided into smaller subsets. For the purposes of the present invention, it is most useful to consider an arrangement of row subsets, as was done with respect to FIG. 5A. Each row subset is fully contained within a row of pixels. In the example of FIG. 8A, component subset 211a has a number of row subsets, shown as 211a1, 211a2, 211a3, and 211a4. Similarly, color component subset 211b has a number of row subsets 211b1, 211b2, 211b3, and 211b4.

Referring specifically to FIG. 8A, component subset 211a contains only panchromatic pixels; component subset 211b contains only color (Bayer pattern) pixels. Moreover, the union of component subsets 211a and 211b form the complete set of pixels represented by pattern 210. In terms familiar to those familiar with mathematical set theory, component subsets 211a and 211b can be said to form a partition of the set represented by pattern 210. In terms more familiar to those skilled in image processing, this separation into components effectively provides a sparse sampling of the rows and columns of pixels of the image sensor. Each component subset is sparsely sampled in at least one dimension, horizontally or vertically, so that each component subset captures different portions of a scene.

FIG. 8B shows this same principle extended to more than two components. Significantly, as shown in FIG. 8B, the same row of pixels can include both panchromatic P and color RGB pixels. The smaller row subsets for each of these component subsets, shown in detail only for component subset 213c in the example of FIG. 8B (that is, shown as row subsets 213c1, 213c2, 213c3, and 213c4), are similarly organized.

In the context of the present invention, the term "component subset" may be simply shortened to "component" as a convenience and to help distinguish components that span multiple rows from row subsets, wherein each row subset is fully contained within its row. Thus, for FIG. 8A, component subsets 211a and 211b are termed components of the array represented by pattern 210. Row subsets are 211a1, 211a2, 211a3, 211a4, 211b1, 211b2, 211b3, and 211b4. Of course, for illustration, FIGS. 8A and 8B show only a small 8×8 portion of the full image array which, in practice, typically extends many hundreds of pixels in each direction. With respect to FIG. 8A, for example, components 211a and 211b would similarly span multiple rows and extend over the full area of the sensor pixels.

Figure 9A:
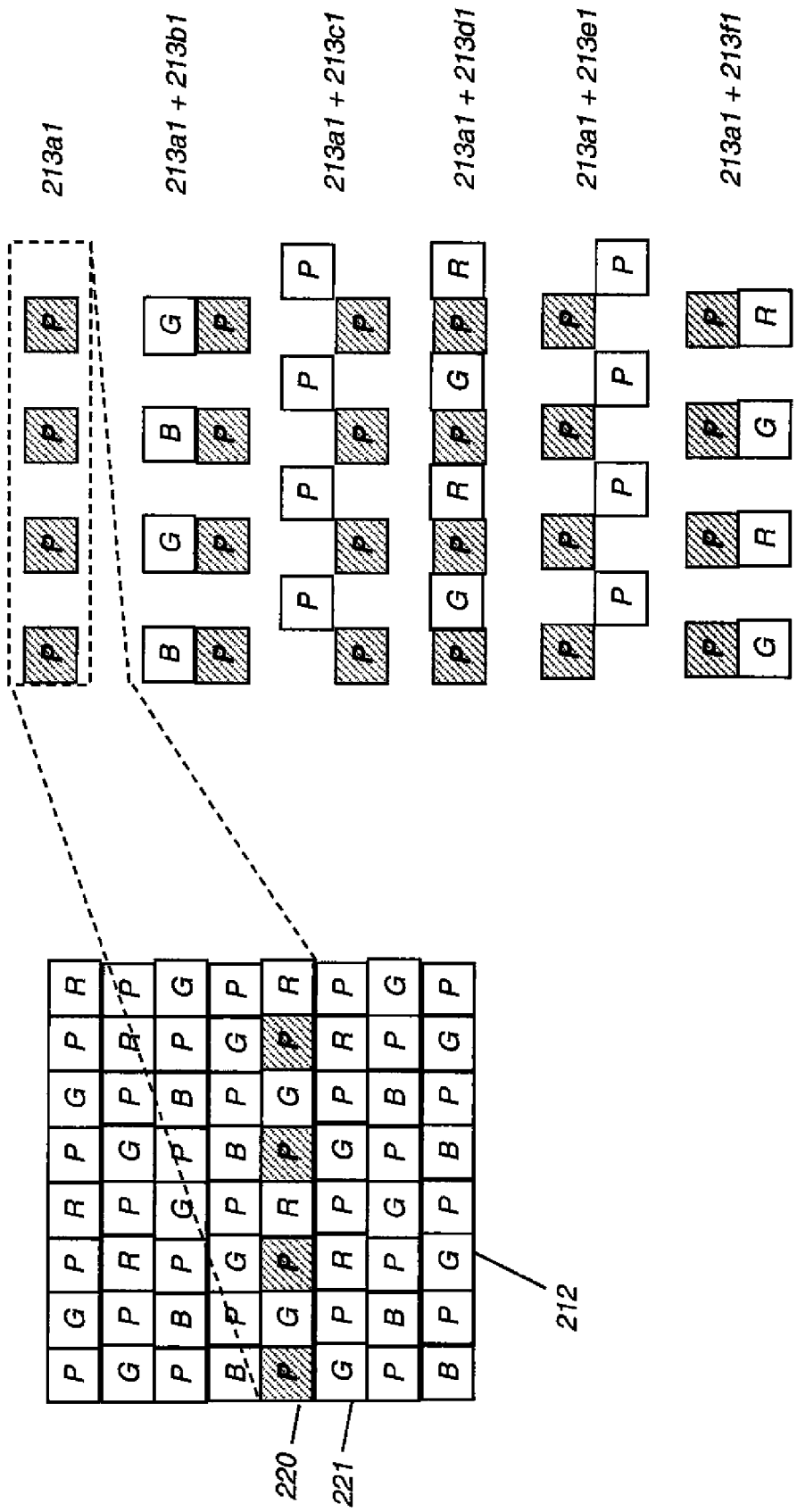
FIG. 9A is a schematic diagram showing possible arrangements of adjacent row subsets.

In the context of the present invention, any two row subsets can be considered to be "adjacent row subsets" when at least some portion of the pixels in one row subset border pixels in the other row subset. Adjacent row subsets need not be in the same row. Referring to FIG. 9A, pattern 212 of FIG. 8B is used as an exemplary arrangement in order to show other arrangements for row subsets that can be considered as adjacent to a panchromatic row subset 213a1. With this segmentation into row subsets, there are five adjacent row subsets for row subset 213a1 (shown shaded in each representation), as follows:

adjacent row subset 213b1 contains color pixels immediately above the panchromatic P pixels of row subset 213a1;

adjacent row subset 213c1 contains panchromatic pixels at a first diagonal to the panchromatic P pixels of row subset 213a1;

adjacent row subset 213d1 contains color pixels in the same row of pixels as the panchromatic P pixels of row subset 213a1;

adjacent row subset 213e1 contains panchromatic pixels at a second diagonal (orthogonal with respect to the first diagonal) to the panchromatic P pixels of row subset 213a1; and adjacent row subset 213f1 contains color pixels in the next row immediately below the panchromatic P pixels of row subset 213a1.

Figure 9B:
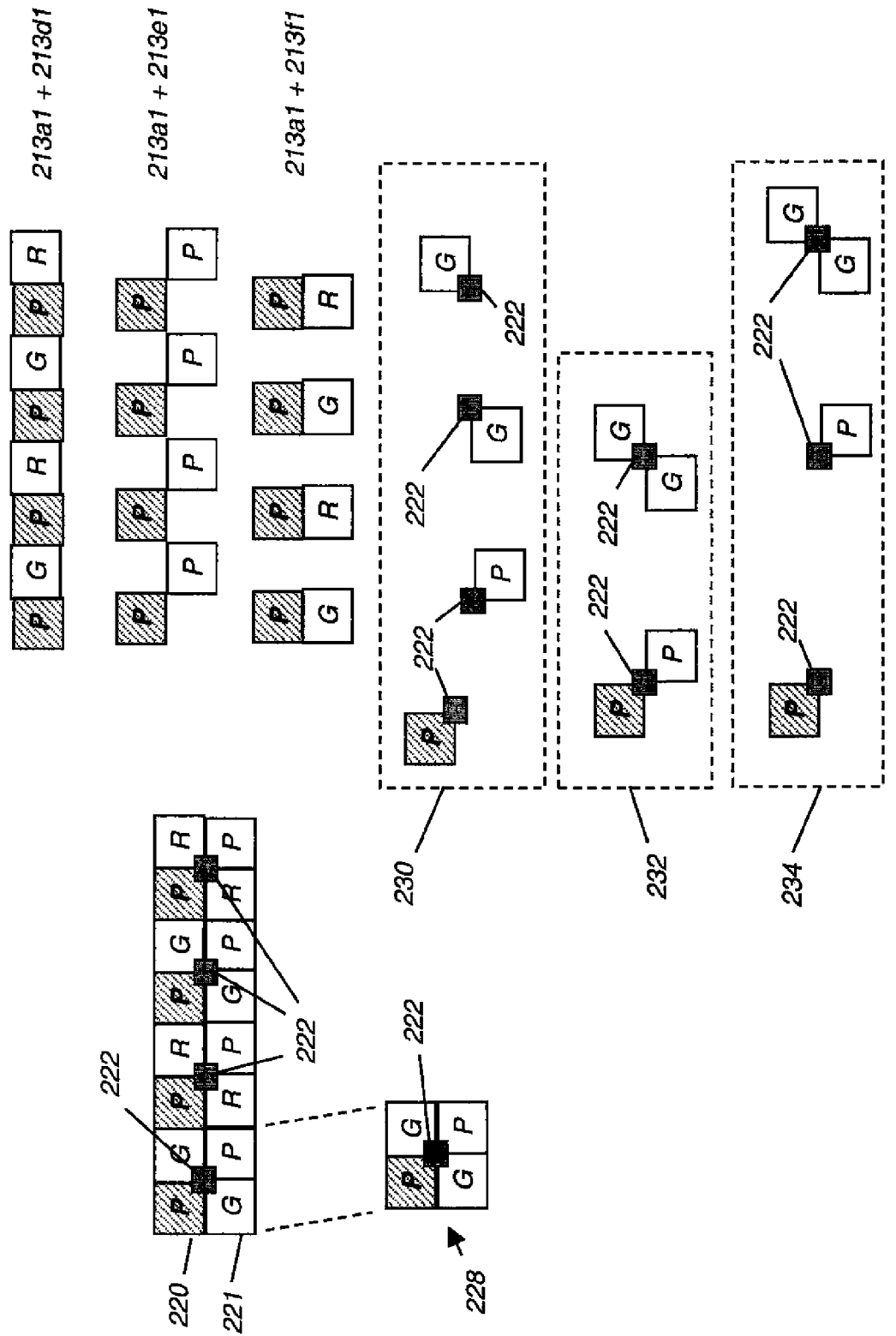
FIG. 9B is a schematic diagram showing how pixels in adjacent rows can be binned together, sharing the same floating diffusion component.

The schematic diagram of FIG. 9B shows how adjacent row subsets can be employed in the readout timing scheme of the present invention in one embodiment. For this description, rows 220 and 221 from FIG. 9A are shown again in FIG. 9B, along with their corresponding row subsets 213a1, 213d1, 213e1, and 213f1. In this embodiment, the underlying readout circuitry for a sensor array uses a floating diffusion 222 that is switchably connected to one or more surrounding pixels at a time. Implementation and use of the floating diffusion is well known to those skilled in the digital image acquisition art. FIG. 9B shows a conventional arrangement in which each floating diffusion 222 serves four surrounding pixels, shown in one example as a quartet 228.

Pixel signals can be switched to floating diffusion 222 in any of a number of combinations. In a readout combination 230, each pixel in quartet 228 has its charge transferred separately to floating diffusion 222 and thus is read individually. In a readout combination 232, panchromatic pixels P are binned, that is, share floating diffusion 222 by emptying their stored charge to floating diffusion 222 at the same time; similarly, both color (G) pixels in the quartet are binned, switching their signals at the same time to floating diffusion 222. In another readout combination 234, panchromatic pixels P are not binned, but are read separately; here color pixels (G) are binned.

Still referring to FIG. 9B, it can be appreciated that there are a number of other binning combinations for using floating diffusion 222 to read the pixels in quartet 228, including reading all four pixels at the same time. However, the three combinations 230, 232, and 234 shown are among the most likely binning arrangements to be used for the majority of imaging conditions when using the pixel pattern shown. The photographically centered exposure method of the present invention, as described earlier for row subsets within the same row, can similarly be used with any combination of adjacent row subsets in which neighboring pixels are binned (including other combinations not shown in FIG. 9B). It is also instructive to note that other arrangements for sharing floating diffusion components can be used, including arrangements where pixels that share the same floating diffusion are vertically or are horizontally arranged. Additionally, binning combinations can also be used for sensor arrays that use only color pixels, such as where color pixels are arranged in the conventional Bayer pattern described earlier. It should be observed that, within any row of pixels with two or more row subsets, reset and readout operations for each row subset are controllably independent of reset and readout operations for the other row subset(s). This independently controllable arrangement applies even where pixels are binned with those in adjacent rows, as shown in FIG. 9B.

Once the photographically centered image data is obtained from one or more groups of binned pixels, this data can be combined with other image data in order to generate an image that is less susceptible to motion error than with previous timing schemes.

Given pixel array patterns such as that shown in FIGS. 7-9B, and given the different sensitivities between pixel types as shown in the graph of FIG. 4, it can be seen that it is generally advantageous to perform separate reads of the two types of pixels to obtain suitable timing for image quality. This requires reading the panchromatic P components and color RGB components separately. In one embodiment, a rolling shutter sequence reads each of the two types of pixels separated into components. Using this conventional sequence with the arrangement of FIG. 8A, each row of color component 211b is read in sequence, then each row of panchromatic component 211a is read.

Figure 10:
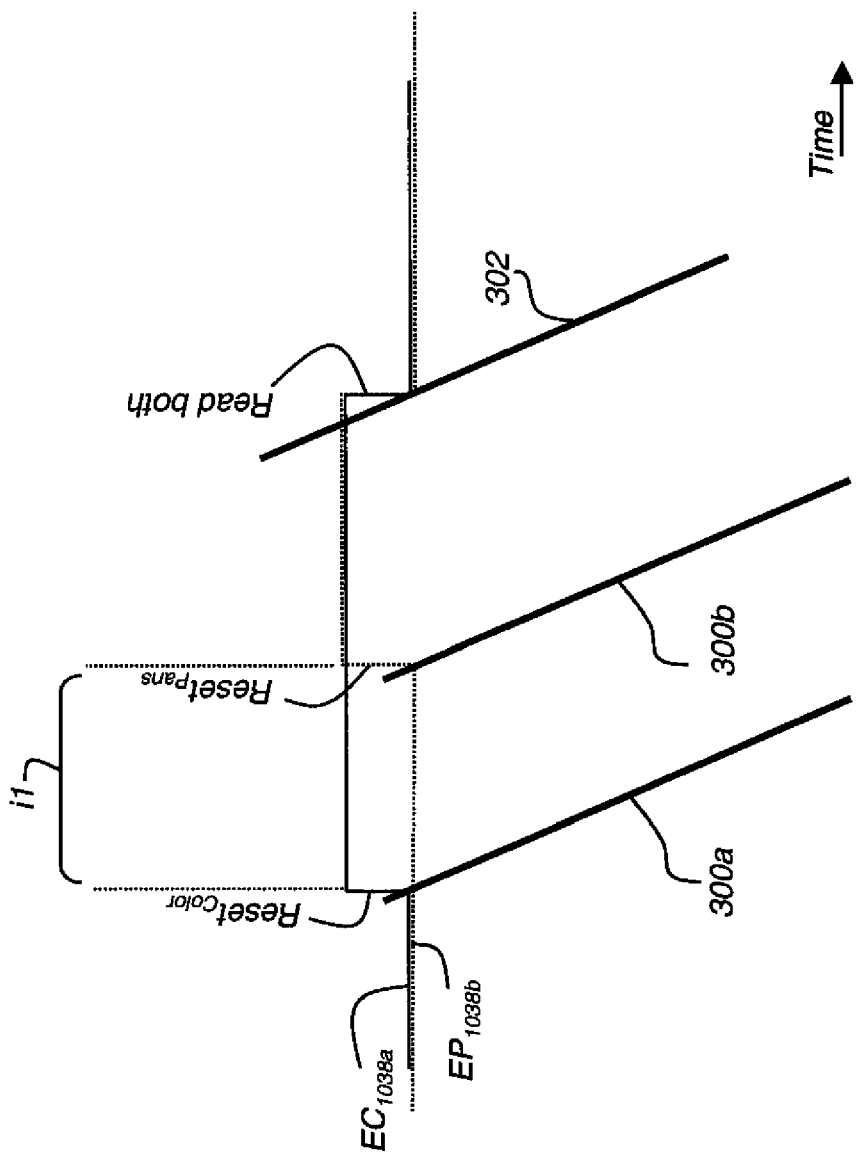
FIG. 10 is a timing diagram for a conventional approach to exposure and readout rolling shutter timing when using two disjoint row subsets, one with color pixels, and one with panchromatic pixels.

FIG. 10 shows a more conventional approach to rolling shutter readout timing for a row of pixels that is made up of both color and panchromatic pixels. As was described earlier for FIG. 5B, pixel row number 1038 is used by way of example. $EC_{1038a}$ shows the exposure interval timing for pixels in a color row subset of row 1038. The exposure interval for color pixels in this row begins at the time indicated by $Reset_{color}$. $EP_{1038b}$ shows the exposure interval for pixels in a panchromatic row subset of row 1038. The exposure interval for panchromatic pixels begins at the time indicated by $Reset_{pans}$. Both color and panchromatic pixels are read at the same time. The rows of the image sensor array are then read successively using the standard rolling shutter sequence. The time interval i1 is the time between $Reset_{color}$ and $Reset_{pans}$ for each row of the image sensor.

As was described with reference to FIG. 5B, this timing sequence for exposure and readout works well enough as long as there is no relative movement between the camera and the subject. The timing difference between exposure/integration and readout of the two subsets of color pixels can essentially be ignored where there is no relative movement. However, in practice, some movement can be anticipated. Thus, the more conventional timing arrangement shown in FIG. 10 can be susceptible to blur and other undesirable motion anomalies.

Figure 11:
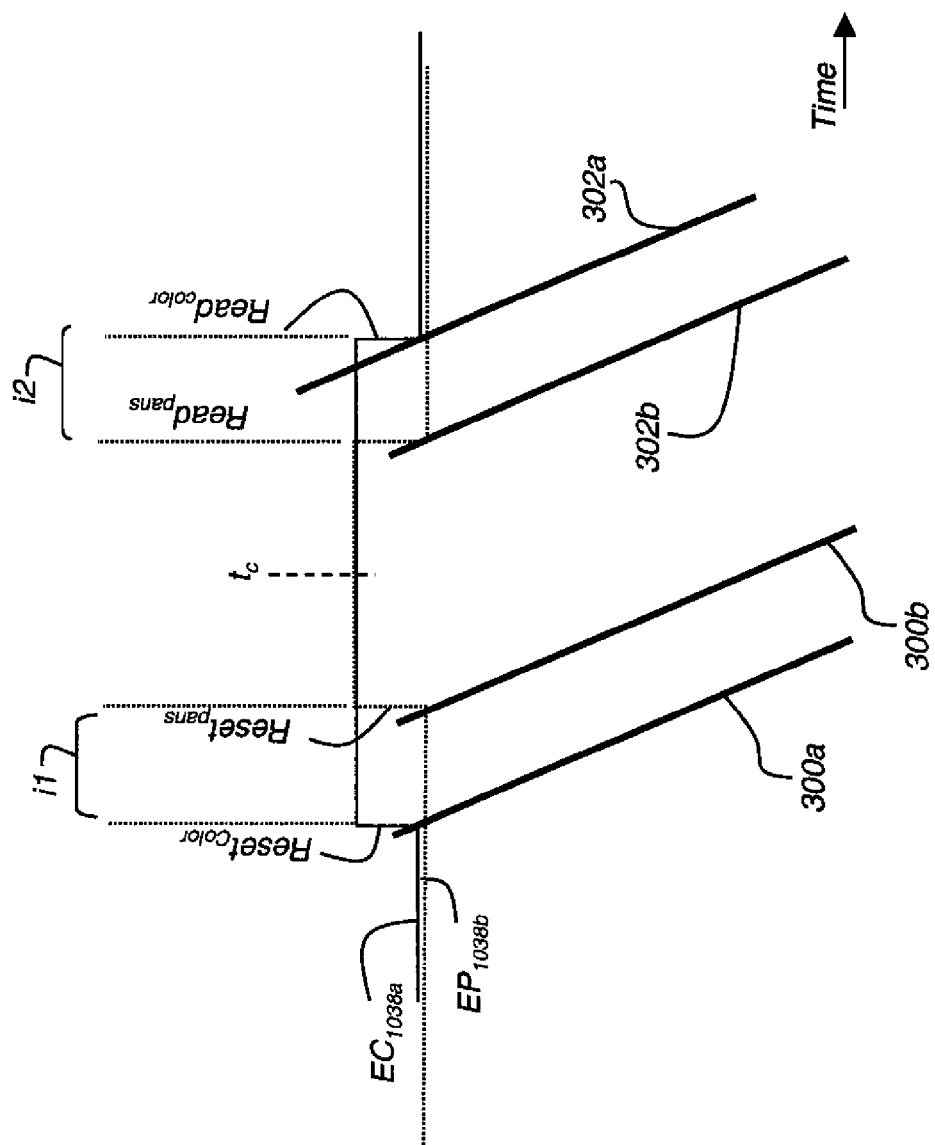
FIG. 11 is a timing diagram showing rolling shutter timing for a segmented row of pixels with both color and panchromatic subsets in one embodiment.

In contrast with the timing shown in FIG. 10, FIG. 11 shows the photographically centered timing used in an embodiment of the present invention. Here, for row 1038 having color and panchromatic pixel subsets, there are two separate reset operations that begin their respective exposure intervals, $Reset_{color}$ and $Reset_{pans}$, and two separate Read operations that end their respective exposure intervals, $Read_{color}$ and $Read_{pans}$. Both exposure curves $EC_{1038a}$ and $EP_{1038b}$ are concentric, substantially centered about the same time $t_c$. As was described for two color row subsets with respect to FIG. 6, this means that intervals i1 and i2 between the respective reset and read operations for the different row subsets within this row of pixels are substantially equal.

The timing sequence shown in FIG. 6 for row subsets using only color pixels and in FIG. 11 for a combination of row subsets with color and panchromatic pixels is markedly different from the conventional row-by-row timing (FIGS. 3A and 3B) used in standard rolling shutter operation. Instead of reading adjacent rows in succession, the method of the present invention reads non-adjacent rows of the image sensor in succession.

Figure 12B:
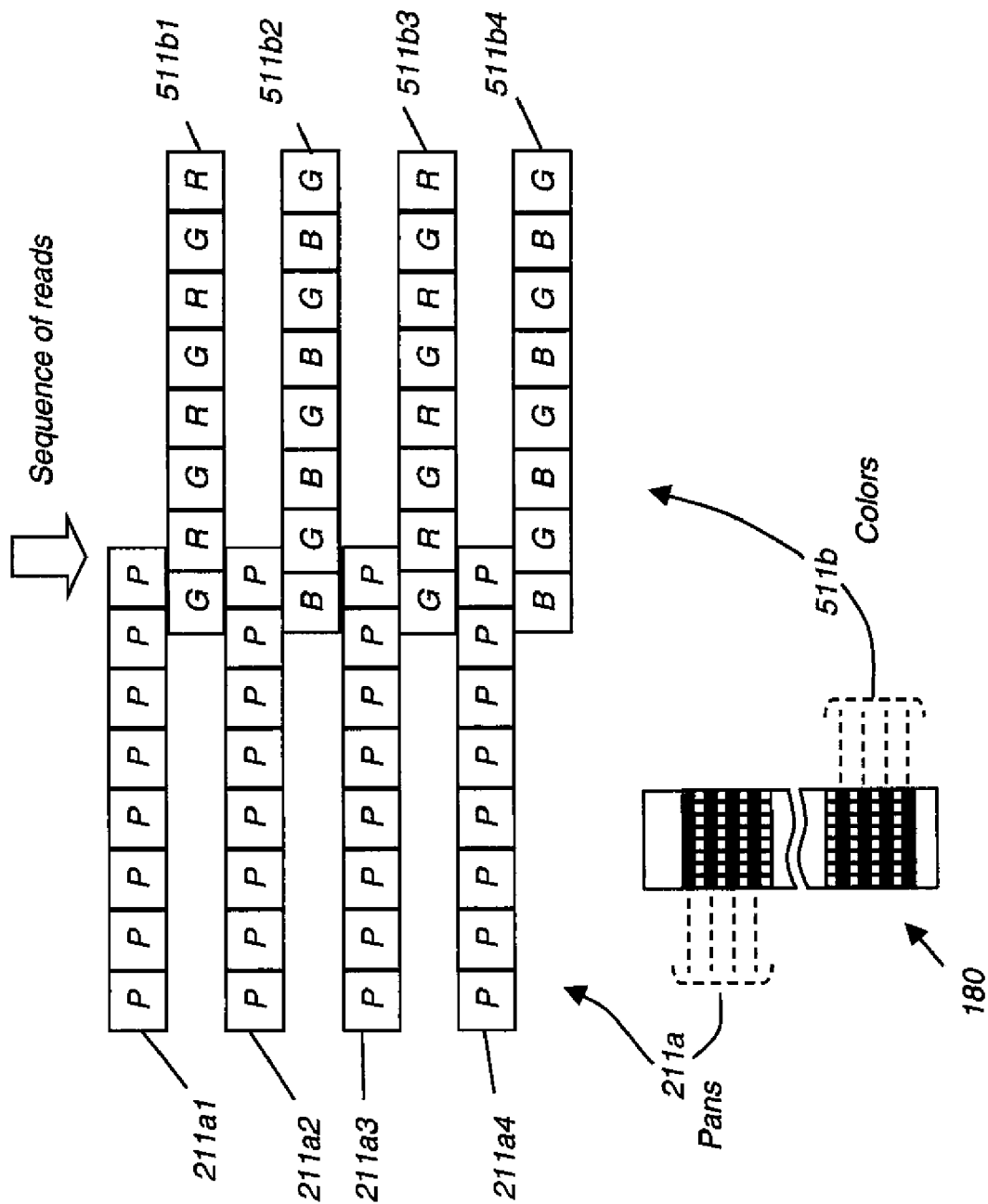
FIG. 12B is a schematic diagram showing how the readout sequence relates to spatial position of pixels in the sensor array.

FIGS. 12A through 12D show how this timing operates in one exemplary embodiment. In FIG. 12A, the novel sequence of readout timing is indicated along a slanted readout line 303 as time is represented moving from left to right. Here, the readout sequence for the image sensor begins by reading the first panchromatic row subset, shown here as $Pan_1$. The next row subset that is read can also be a panchromatic row. However, as the readout sequence progresses, successive readout operations soon alternate between row subsets of panchromatic pixels and row subsets of color pixels. Stated differently, the readout operation alternates between reading row subsets of color and panchromatic components. Moreover, the read operations on row subsets $Pan_1$-$Pan_n$ are interleaved over a portion of the cycle with the read operations on row subsets $Color_1$-$Color_n$. This is in contrast to existing methods that read the full color or panchromatic component at a time, in sequential rows from top to bottom of the image sensor.

As shown in FIG. 12A, these panchromatic and color readings alternate over at least some portion of the readout cycle (line 303). This is illustrated by showing $Pan_{200}$, $Color_{17}$, $Pan_{201}$, and $Color_{18}$ interleaved in time. In this example, $Pan_1$ through $Pan_{184}$ would be read with no color row subsets being interleaved. Then, color row subsets would be interleaved with panchromatic row subsets, starting with $Color_1$ between $Pan_{184}$ and $Pan_{185}$. This alternation of read operations for panchromatic and color row subsets differentiates the readout sequence of the present invention from conventional readout methods or those that read the full color component, then read the full panchromatic component. In addition, the beginning and end portions of the readout cycle, as shown along line 303, differ from conventional readout. For the example described in FIGS. 12A-12D, there is a full read of all panchromatic row subsets of pixels of the imaging array over only a first portion of the readout cycle (that is, for an upper portion of line 303). Similarly, there is a full read of color row subsets of pixels for only a second portion of the readout cycle (that is, for a lower portion of line 303). These first and second portions overlap at least partially.

The schematic diagram of FIG. 12B shows how the readout timing method of the present invention alternates between reads of adjacent panchromatic and color pixel row subsets and shows how sequential reads occur for row subsets that are spatially offset with regard to a sensor array 180. The sequence of readout operations is from top to bottom in this figure, as indicated. For this example, sensor array 180 is illustrated as 8 pixels wide, with successive rows of panchromatic pixels and color pixels. To keep this example simple, each complete row of panchromatic pixels is a row subset, as was described with reference to FIG. 5A. Thus, for FIG. 12B, component subsets 211a and 511b are termed components of the array 180. Of course, for illustration, FIG. 12B shows only a small 8×8 portion of the full image array which, in practice, typically extends many hundreds of pixels in each direction. With respect to FIG. 12B, for example, components 211a and 511b would similarly span multiple rows and extend over the full area of the sensor pixels. Similarly, each row of color pixels is a row subset. Spatially, as represented by the partial thumbnail of sensor array 180 in FIG. 12B, panchromatic row subsets 211a1, 211a2, 211a3, and 211a4, belonging to component 211a, are not adjacent to color row subsets 511b1, 511b2, 511b3, 511b4, belonging to component 511b. However, as shown by the sequence of reads in FIG. 12B and as described earlier with reference to FIG. 12A, these non-adjacent row subsets are read in succession. Color read-out operations are thus interleaved with panchromatic read-out operations.

The read-out timing described in FIGS. 12A and 12B, in which row subsets are complete rows of pixels, can be used in similar manner with array arrangements such as those shown in FIG. 8B, where a row is segmented into two or more row subsets. Where there is such segmentation, different row subsets within a row are reset and read at different times.

Figure 12C:
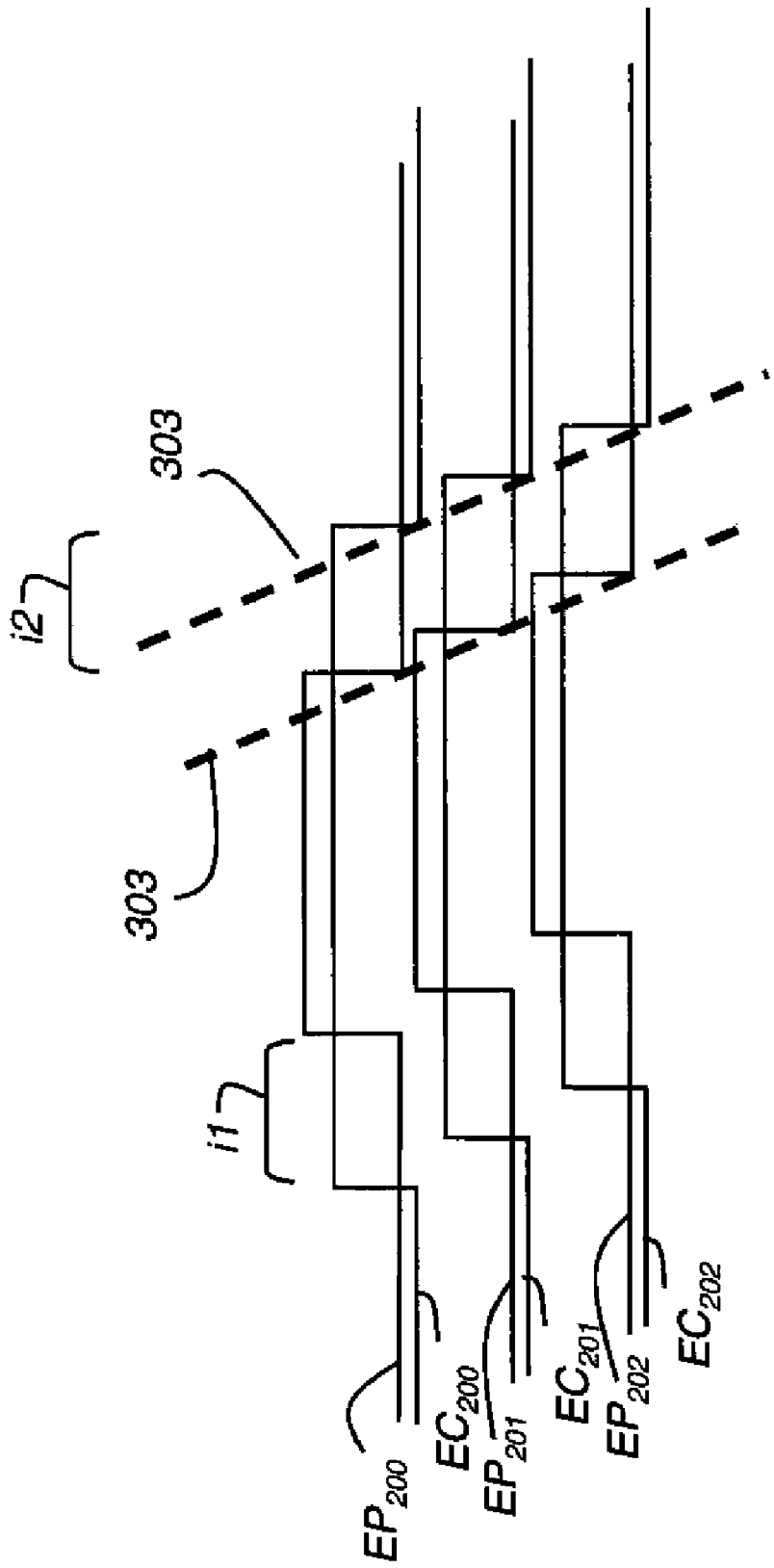
FIG. 12C is a timing diagram showing combined exposure for different panchromatic and color components according to one embodiment.

The alternate timing diagram of FIG. 12C shows, in another way, how the timing method of the present invention differs from the conventional rolling shutter timing as was described earlier. In FIG. 12C, exposure intervals $EP_{200}$, $EP_{201}$, and $EP_{202}$ for row subsets of panchromatic pixels are again superimposed over and photographically centered with the corresponding exposure intervals $EC_{200}$, $EC_{201}$, and $EC_{202}$ for color row subsets in the same or in adjacent rows. As was shown in FIGS. 12A and 12B, after reading a row of panchromatic pixels (for example, $Pan_{200}$), the imager circuitry next reads a row of color pixels (continuing with the FIG. 12A example, $Color_{17}$). This spatial offset and alternating read sequence are represented by slanted line 303 as a dashed line and shown in two places in FIG. 12C.

FIG. 12D shows what is achieved when using this photographically centered timing offset. As indicated around the instant of time represented by the phantom line at time $t_c$, exposure intervals for panchromatic and color pixels in the same or in adjacent row subsets, $EP_{200}$ and $EC_{200}$ in this example, are substantially temporally concentric. That is, these exposure periods are centered about the same instant in time, shown as time $t_c$. Notably, as can be concluded from FIGS. 12A and 12B, there is a timing delay between the readout of a row subset of panchromatic pixels and the readout of an adjacent row subset of color pixels in the same row with which the pixel data is to be combined.

It must be emphasized that in order for two exposure periods be substantially photographically centered (temporally concentric), the shorter exposure period begins after a first interval of time i1 following the beginning of the longer exposure period and ends a second interval of time i2 before the longer exposure period ends, and the first and second intervals of time i1 and i2 vary from each other by no more than about 20% of the length of the longer exposure period.

Using photographically centered exposure intervals for panchromatic and color pixel row subsets in the same row or in adjacent rows provides a number of advantages. Among its advantages, this arrangement provides the same benefits obtained when using an extended exposure period, but suppresses the side-effects of motion blur that would otherwise accompany such extended exposure. The color signal itself has reduced noise. Color information can be more readily combined with the panchromatic pixel data, since the need for motion estimation or compensation is reduced or eliminated.

Other embodiments of the present invention extend this same principle of photographically centered exposure to arrangements with multiple components, where exposure times are concentric within a row, but vary in different ways. In particular, different row subsets of panchromatic pixels can be provided with longer and shorter exposure times for different reasons.

As the timing diagrams of FIGS. 12A-12D show, the timing sequence of the present invention sets the exposure period for a first row subset of color pixels to be photographically centered with the exposure period of a second row subset of panchromatic pixels that are in the same row of the image sensor as the first subset of color pixels.

Figure 13:
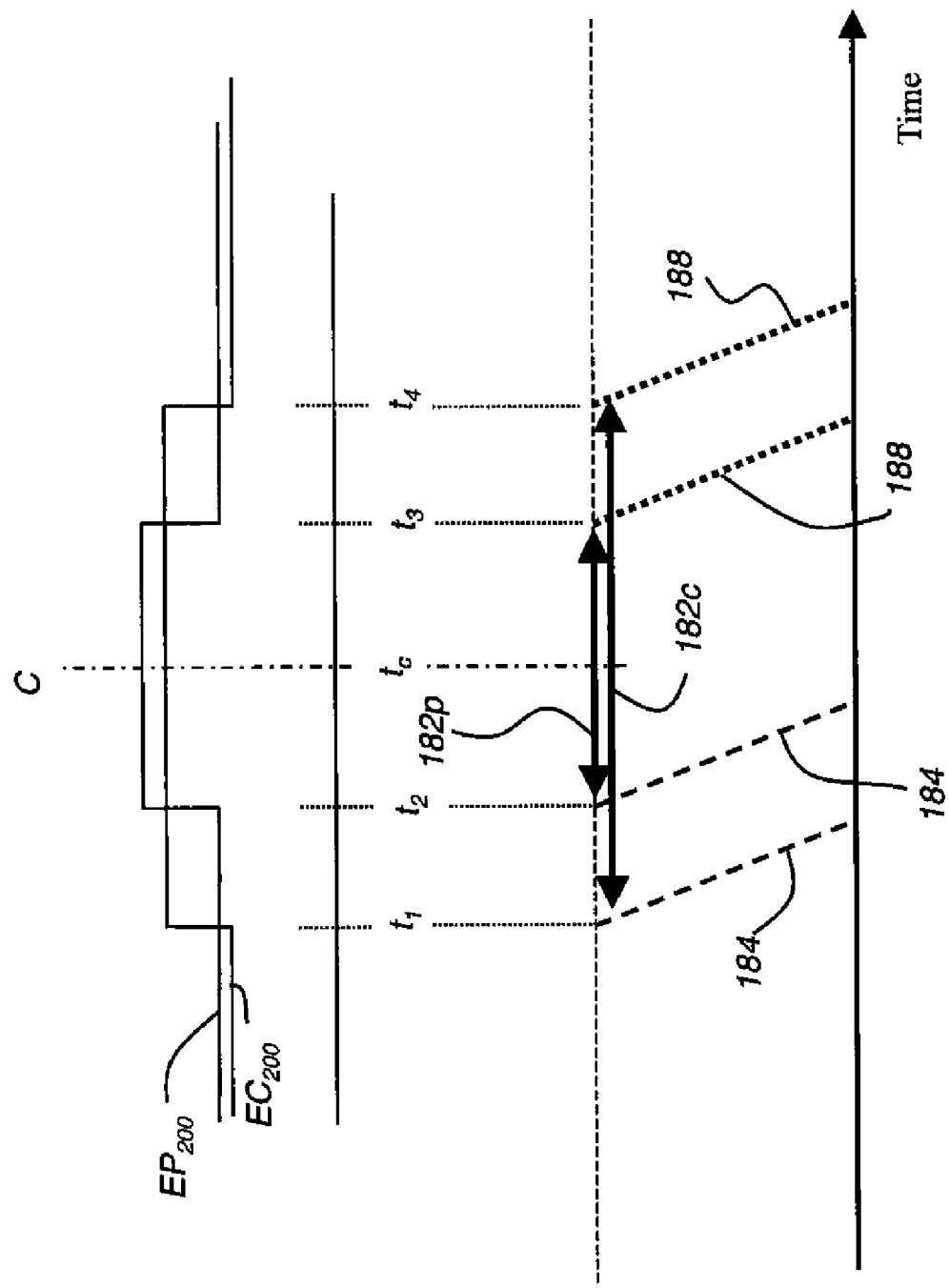
FIG. 13 is a timing diagram that shows how the concentric readout timing of the present invention relates to rolling readout timing.

The timing diagram of FIG. 13 shows how the relative timing of integration intervals relates to rolling readout timing using the concentric exposure method of the present invention. The timing of exposure intervals 182p and 182c for a panchromatic row subset and a color row subset in the same row, respectively, are shown. Reset 184 for beginning exposure of the color row subset occurs at time $t_1$. Readout 188 for ending the exposure of this color row subset, and obtaining its exposure signal value, occurs at time $t_4$. Reset 184 for initiating exposure of the panchromatic row subset occurs at time $t_2$. Readout 188 that terminates exposure and obtains the exposure signal value for the panchromatic pixels occurs at time $t_3$. As the timing diagram of FIG. 13 shows, there is a substantially equal delay $(t_2-t_1)$ to $(t_4-t_3)$ between reset and readout operations when the pixel integration/exposure times are photographically centered, that is, temporally concentric.

FIGS. 12A and 12B used the simple example in which each of row subsets 211a1, 211a2, 211a3, 211a4, 511b1, 511b2, 511b3, and 511b4 includes the full row of pixels. As was noted earlier, however, more complex patterns of row subsets can be used, wherein a row of pixels is arranged into three or more row subsets. This more elaborate arrangement, with any number of row subsets within the same row, permits a more complex timing arrangement when using concentric photographically centered exposure. Other arrangements can be used when binning pixels, wherein row subsets in adjacent rows share the same floating diffusion components, as was described earlier with reference to FIG. 9B.

Figure 14:
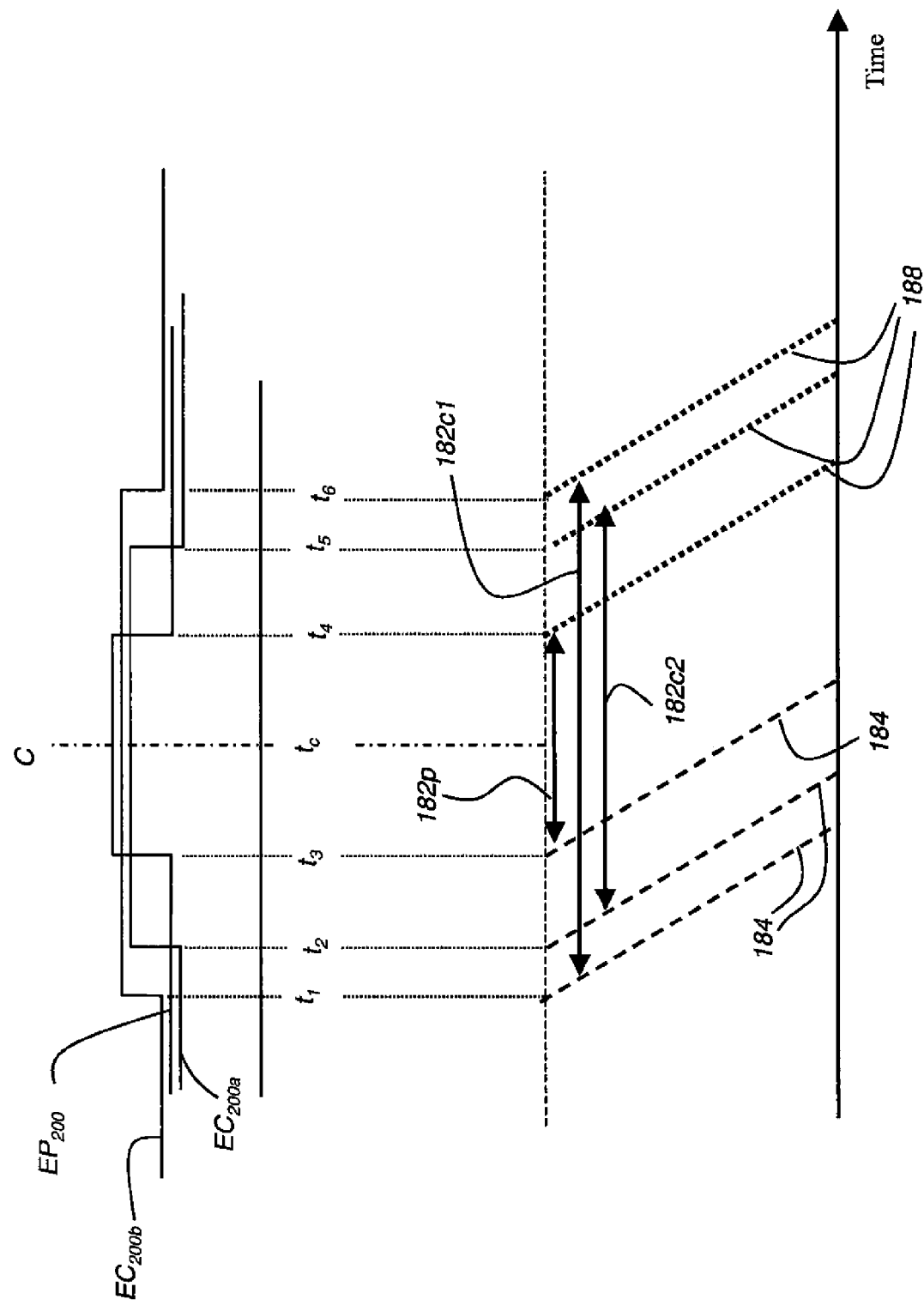
FIG. 14 is a timing diagram that shows how the concentric readout timing of the present invention relates to rolling readout timing for a more complex arrangement of row subsets.

The timing diagram of FIG. 14 shows relative photographically centered timing of exposure intervals for an embodiment having two color row subsets and one panchromatic row subset. Exposure timing for the two color row subsets is shown by curves $EC_{200a}$, beginning at time $t_2$ and ending at time $t_5$, and $EC_{200b}$, beginning at time $t_1$ and ending at time $t_6$, and by exposure intervals labeled 182c1 and 182c2. Exposure timing for the panchromatic row subset is shown by curve $EP_{200}$ and by exposure interval 182p, beginning at time $t_3$ and ending at time $t_4$. As with the FIG. 13 example, each of the exposure intervals for these row subsets that are in the same row are temporally concentric about time $t_c$. For this FIG. 14 example, the following equalities substantially hold, all to within at least 20% of the longest exposure interval, here $EC_{200b}$:

$$\text{interval}(t_3-t_1)=\text{interval}(t_6-t_4)$$

$$\text{interval}(t_2-t_1)=\text{interval}(t_6-t_5)$$

$$\text{interval}(t_3-t_2)=\text{interval}(t_5-t_4)$$

As FIGS. 6-14 show, the method of the present invention changes the conventional rolling shutter timing sequence that is used for obtaining image data from a digital sensor array. The method of the present invention permits panchromatic pixel data to be combined with color pixel data without the need for computationally involved motion estimation. With exposure times temporally centered about the same time $t_c$ for adjacent row subsets, the method of the present invention thus simplifies the task of combining panchromatic and color data. Techniques for combining pixel data from pixels that obtain different light levels from the same scene content are well known to those skilled in the art. The timing method of the present invention allows a number of schemes for image data combination as well as for compensating for motion effects.

In addition to advantages for pixel data combination, the method of the present invention also permits data from pixels in adjacent row subsets to be pooled or binned together. As was described earlier with reference to FIG. 9B, where two panchromatic pixels or two color pixels are contingent, but lie in different rows, their accumulated charge can be binned, added together to collect more image data. This pooling or binning of pixel charge can lower image resolution, but improve other aspects of image quality, such as contrast.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, any of a number of arrangements of row subsets for an image sensor could be used. Exposure times can be adjusted for low-light conditions or for motion imaging.

Thus, what is provided is a concentric exposure timing scheme for photographically centered readout of an image sensor having color pixels or both color and panchromatic pixels.

PARTS LIST

| | PARTS LIST |
|---|---|
| 10 | Light |
| 11 | Imaging stage |
| 12 | Lens |
| 13 | Neutral density (ND) filter |
| 14 | Iris |
| 16 | Brightness sensor |
| 18 | Shutter |
| 20 | Image sensor |
| 22 | Analog signal processor |
| 24 | A/D converter |
| 26 | Timing generator |
| 28. | Image sensor stage |
| 30 | Bus |
| 32 | Memory |
| 36 | Digital Signal Processor (DSP) |
| 38 | Processing stage |
| 40 | Exposure controller |
| 50 | System controller |
| 52 | Bus |
| 54 | Program memory |
| 56 | System memory |
| 57 | Host interface |
| 60 | Memory card interface |
| 62 | Socket |
| 64 | Memory card |
| 68 | User interface |
| 70 | View finder display |
| 74 | User inputs |
| 72 | Exposure display |
| 76 | Status display |
| 80- | video encoder |
| 82 | Display controller |
| 88 | Image display |
| 100 | Pixel block |
| 102 | Pixel Block |
| 110 | Curve |
| 112 | Curve |
| 114 | Curve |
| 116 | Curve |
| 118 | Curve |
| 180 | Sensor array |
| 182p | Exposure interval |
| 182c | Exposure interval |
| 182c1 | Exposure interval |
| 182c2 | Exposure interval |
| 184 | Reset |
| 188 | Readout |
| 210 | Pattern |
| 212 | Pattern |
| 211a | Component subset |
| 211b | Component subset |
| 213a | Component subset |
| 213b | Component subset |
| 213c | Component subset |
| 213d. | Component subset |
| 211a1 | Row subset |
| 211a2 | Row subset |
| 211a3 | Row subset |
| 211a4 | Row subset |
| 211b1 | Row subset |
| 211b2 | Row subset |
| 211b3 | Row subset |
| 211b4 | Row subset |
| 213a1 | Row subset |

PARTS LIST

| | |
|---|---|
| 213b1 | Row subset |
| 213c1 | Row subset |
| 213c2 | Row subset |
| 213c3 | Row subset |
| 213c4 | Row subset |
| 213d1 | Row subset |
| 213e1 | Row subset |
| 213f1 | Row subset |
| 220 | Row |
| 221 | Row |
| 222 | Floating diffusion |
| 228 | Quartet |
| 230 | Combination |
| 232 | Combination |
| 234 | Combination |
| 300 | Reset |
| 300a | Reset |
| 300b | Reset |
| 302 | Read |
| 302a | Readout |
| 302b | Readout |
| 303 | Readout line |
| 310 | Pattern |
| 311 | Pattern |
| 312 | Pattern |
| 313 | Pattern |
| 320 | Pixel Integration time |
| 511b | Component subset |
| 511b1 | Row subset |
| 511b2 | Row subset |
| 511b3 | Row subset |
| 511b4 | Row subset |
| 1037 | Pixel row |
| 1038 | Pixel row |
| 1038a | Row subset |
| 1038b | Row subset |
| 1039 | Pixel row |
| 1040 | Pixel row |
| 1041 | Pixel row |
| 1042 | Pixel row |
| 1043 | Pixel row |
| 1044 | Pixel row |
| 1045 | Pixel row |
| 1046 | Pixel row |
| i1 | Interval |
| i2. | Interval |
| $t_1$ | Time instant |
| $t_2$ | Time instant |
| $t_3$ | Time instant |
| $t_4$ | Time instant |
| $t_5$ | Time instant |
| $t_6$ | Time instant |
| $t_c$ | Time instant |
| $EC_{200}$ | Exposure curve |
| $EC_{200a}$ | Exposure curve |
| $EC_{200b}$ | Exposure curve |
| $EC_{201}$ | Exposure curve |
| $EC_{202}$ | Exposure curve |
| $EC_{1038a}$ | Exposure curve |
| $EC_{1038b}$ | Exposure curve |
| $EC_{1039}$ | Exposure curve |
| $EP_{200}$ | Exposure curve |
| $EP_{201}$ | Exposure curve |
| $EP_{202}$ | Exposure curve |
| $EP_{1038b}$ | Exposure curve |
| $Color_1$ | Readout |
| $Color_{17}$ | Readout |
| $Color_{18}$ | Readout |
| $Color_n$ | Readout |
| $Pan_1$ | Readout |
| $Pan_{200}$ | Readout |
| $Pan_{201}$ | Readout |
| $Pan_n$ | Readout |
| $Read_{1038a}$ | Read signal |
| $Read_{1038b}$ | Read signal |
| $Read_{color}$ | Read signal |
| $Read_{pans}$ | Read signal |
| $Reset_{1038a}$ | Reset signal |
| $Reset_{1038b}$ | Reset signal |
| $Reset_{color}$ | Reset signal |
| $ReSet_{pans}$ | Reset signal |

The invention claimed is:

1. A method for image capture comprising:
   (a) providing an image sensor having at least one segmented row of a plurality of rows of pixels, wherein the at least one segmented row comprises at least first and second row subsets of pixels selected from every other pixels of the at least one segmented row, wherein a reset operation of the first row subset is independently controlled with respect to a reset operation of the second row subset, and wherein a readout operation of the first row subset is independently controlled with respect to a readout operation of the second row subset;
   (b) timing a first exposure interval of the first row subset to be photographically centered with a second exposure interval of the second row subset, the first exposure interval being different from the second exposure interval; and
   (c) combining image data obtained from exposure signals of the first and second row subsets to form a row of pixel values, wherein exposure signals of the plurality of rows of pixels are sequentially read in a row-by-row manner.

2. The method of claim 1 wherein both the first and the second row subsets have color pixels.

3. The method of claim 1 wherein the first row subset has color pixels and the second row subset has panchromatic pixels.

4. The method of claim 1 wherein combining the image data further comprises combining image data obtained from pixels in different rows.

5. The method of claim 1 wherein the at least one segmented row further comprises a third row subset, also disjoint with respect to the first and second row subsets and wherein the exposure interval of the third subset is photographically centered with the exposure intervals of the first and second subsets.

6. A method for image capture comprising:
   (a) providing an image sensor having at least one segmented row of a plurality of rows of pixels, wherein the at least one segmented row comprises at least first and second row subsets of pixels selected from every other pixels of the at least one segmented row, wherein each row subset can be separately read and reset;
   (b) exposing pixels within the at least one row of pixels by:
      (i) resetting the first row subset to begin a first exposure and, after a first interval, resetting the second row subset to begin a second exposure;
      (ii) reading the second row subset to end the second exposure and obtain a second exposure signal value and, after a second interval, reading the first row subset to end the first exposure and obtain a first exposure signal value, wherein the durations of the first interval and second interval are configured to be within 20% of the duration of the first exposure; and
   (c) combining the image data obtained from the first and second exposure signal values to form a row of pixel values, wherein exposure signal values of the plurality of rows of pixels are sequentially read in a row-by-row manner.

7. The method of claim 6 wherein both the first and the second row subsets have color pixels.

8. The method of claim 6 wherein the first row subset has color pixels and the second row subset has panchromatic pixels.

9. The method of claim 6 wherein combining the image data further comprises combining image data obtained from pixels in different rows.

* * * * *